United States Patent
Geistlinger et al.

(10) Patent No.: US 12,458,039 B2
(45) Date of Patent: Nov. 4, 2025

(54) RECOMBINANT MILK PROTEINS AND COMPOSITIONS COMPRISING THE SAME

(71) Applicant: PERFECT DAY, INC., Berkeley, CA (US)

(72) Inventors: Timothy Geistlinger, Oakland, CA (US); Ravirajsinh P. Jhala, Castro Valley, CA (US); Heather Jensen, Oakland, CA (US); Hendrik Meerman, Encinitas, CA (US)

(73) Assignee: PERFECT DAY, INC., Berkeley, CA (US)

( * ) Notice: Subject to any disclaimer, the term of this patent is extended or adjusted under 35 U.S.C. 154(b) by 889 days.

(21) Appl. No.: 17/605,920

(22) PCT Filed: Apr. 22, 2020

(86) PCT No.: PCT/US2020/029392
§ 371 (c)(1),
(2) Date: Oct. 22, 2021

(87) PCT Pub. No.: WO2020/219596
PCT Pub. Date: Oct. 29, 2020

(65) Prior Publication Data
US 2022/0211061 A1 Jul. 7, 2022

Related U.S. Application Data

(60) Provisional application No. 62/837,098, filed on Apr. 22, 2019.

(51) Int. Cl.
| | | |
|---|---|---|
| *A61K 35/20* | (2006.01) | |
| *A23C 11/00* | (2006.01) | |
| *C07K 14/47* | (2006.01) | |
| *C07K 14/76* | (2006.01) | |

(52) U.S. Cl.
CPC .......... *A23C 11/00* (2013.01); *C07K 14/4717* (2013.01); *C07K 14/4732* (2013.01); *C07K 14/76* (2013.01)

(58) Field of Classification Search
None
See application file for complete search history.

(56) References Cited

U.S. PATENT DOCUMENTS

| | | | |
|---|---|---|---|
| 10,595,545 B2 * | 3/2020 | Pandya | A23L 9/22 |
| 11,076,615 B2 * | 8/2021 | Pandya | A23C 9/1307 |
| 2017/0273328 A1 * | 9/2017 | Pandya | A23C 9/123 |
| 2018/0271111 A1 * | 9/2018 | Pandya | C07K 14/4732 |
| 2018/0343882 A1 * | 12/2018 | Reif | A61P 35/00 |

OTHER PUBLICATIONS

Seifu et al. (2005) Trends in Food Science & Technology 16: 137-154. (Year: 2005).*
He, et al. Preparation, immunological characterization and polyclonal antibody development for recombinant epitope tandem derived from bovine beta-lactoglobulin. Food and Agricultural Immunology, Jun. 1, 2016, vol. 27, No. 6, pp. 806-819. Especially abstract; Table 1.
Holland et al., Analysis of O-glycosylation site occupancy in bovine k-casein glycoforms separated by two-dimensional gel electrophoresis, Proteomics, Mar. 9, 2005, vol. 5, No. 4, p. 990-1002. Especially abstract.
NPL_Kalidas_Characterization_of_glycosylated_variants_of_B-lactoglobulin_expressed_in_Pichia_pastoris; Protein Engineering, Design and Selection, vol. 14, Issue 3, Mar. 2001, pp. 201-207, https://doi.org/10.1093/protein/14.3.201.
NPL_Stals_Factors_influencing_glycosylation_of_Trichoderma_reesei_cellulases._I: Postsecretorial_changes_of_the_O_and_N_glycosylation_patternof_Cel7A; Glycobiology. Aug. 2004;14(8):713-24. doi:10.1093/glycob/cwh080. Epub Apr. 7, 2004. PMID: 15070858.
NPL_Tatsumi_Introducing_Site_Specific_Glycosylation_Using_Protein_Engineering_Techniques_Reduces_the_Immunogenicity_of_B_Lactoglobulin; Biosci Biotechnol Biochem. 2012;76(3):478-85. doi: 10.1271/bbb.110753. PMID: 22451388.

* cited by examiner

*Primary Examiner* — Russell G Fiebig
(74) *Attorney, Agent, or Firm* — David R. Conklin; Kirton McConkie

(57) ABSTRACT

Provided are recombinant milk proteins with non-native PTMs, food products comprising the recombinant milk proteins, and methods of obtaining the recombinant milk proteins and for manufacturing the food products.

25 Claims, No Drawings

RECOMBINANT MILK PROTEINS AND COMPOSITIONS COMPRISING THE SAME

RELATED APPLICATIONS

This application is a National Stage of International Application No. PCT/US2020/029392, filed Apr. 22, 2020, and entitled RECOMBINANT MILK PROTEINS AND COMPOSITIONS COMPRISING THE SAME, which claims the benefit of U.S. Provisional Application No. 62/837,098 filed Apr. 22, 2019. This application claims priority to and incorporates herein by reference the above-referenced applications in their entirety.

FIELD OF THE INVENTION

The present invention relates generally to recombinant milk proteins, compositions comprising such recombinant milk proteins, and to methods for producing such recombinant milk proteins and compositions. In particular, the present invention relates to recombinant milk proteins having non-native post-translational modifications.

BACKGROUND OF THE INVENTION

Milk is a popular source of nutrition. It comprises high-quality proteins, essential minerals, and vitamins. In addition, milk comprises proteins with advantageous functional characteristics that permit production of a wide variety of derivative products (e.g., yogurt, cheese, cream, butter) and that are useful in industrial applications (e.g., production of polymers, therapeutics, household products).

There is widespread concern over the impact of conventional milk production via animal husbandry on animal welfare and the environment, and the potential danger of contaminating products derived from animal husbandry. Moreover, milk comprises components (e.g., lactose, allergens, saturated fats, cholesterol) that can cause unhealthy reactions in humans but that are not easily removed or avoided in the course of conventional, animal-based production processes.

These concerns have fueled development of alternatives to milk and dairy products (e.g., lactose-free, plant-based, and nut-based milk-/dairy-like food products). However, these efforts have to date fallen short on matching flavor and nutritional profile of milk and dairy products, and on recreating proteins that have identical or similar functionalities as native milk proteins.

Therefore, there exists a need for proteins that have identical or similar, if not superior, attributes as native milk proteins.

INCORPORATION BY REFERENCE

All publications, patents, patent applications, sequences, database entries, and other references mentioned herein are incorporated by reference in their entireties to the same extent as if each individual publication, patent, patent application, sequence, database entry, or other reference was specifically and individually indicated to be incorporated by reference. In case of conflict, the present specification, including definitions, will control.

SUMMARY OF THE INVENTION

In one aspect, provided herein is a recombinant milk protein that comprises a non-native post-translational modification (PTM).

The recombinant milk protein of the invention can be a recombinant β-lactoglobulin comprising an amino acid sequence that comprises one or more of amino acid residues selected from T4, T6, T18, S21, S27, S30, S36, T49, T76, T97, S110, S116, T125, S150, N152, and T154 of *Bos taurus* β-lactoglobulin, and having non-native glycosylation on one or more of such amino acid residues.

The recombinant milk protein of the invention can be a recombinant β-lactoglobulin comprising an amino acid sequence that comprises amino acid residue N152 of *Bos taurus* β-lactoglobulin, and having non-native N-glycosylation on such amino acid residue.

The recombinant milk protein of the invention can be a recombinant β-lactoglobulin comprising an amino acid sequence that comprises one or more of amino acid residues selected from T4, T6, T18, S21, S27, S30, S36, T49, T97, S110, S116, T125, S150, and T154 of *Bos taurus* β-lactoglobulin, and having non-native O-glycosylation on one or more of such amino acid residues.

The recombinant milk protein of the invention can be a recombinant β-lactoglobulin comprising an amino acid sequence that comprises one or more of amino acid residues selected from T4, T6, T18, Y20, S21, S27, S30, S36, Y42, T49, T76, T97, Y99, Y102, S110, S116, T125, S150, and T154 of *Bos taurus* β-lactoglobulin, and having non-native phosphorylation on one or more of such amino acid residues.

The recombinant milk protein of the invention can be a recombinant β-lactoglobulin comprising an amino acid sequence that comprises one or more of amino acid residues selected from K8, K14, R40, K47, K60, K69, K70, K75, K77, K83, K91, K100, K101, R124, K135, K138, K141, and R148 of *Bos taurus* β-lactoglobulin, and having non-native methylation on one or more of such amino acid residues.

The recombinant milk protein of the invention can be a recombinant β-lactoglobulin comprising an amino acid sequence that comprises one or more of amino acid residues selected from C66, C106, C119, C121, and C160 of *Bos taurus* β-lactoglobulin, and having non-native palmitoylation on one or more of such amino acid residues.

The recombinant milk protein of the invention can be a recombinant β-lactoglobulin comprising an amino acid sequence that comprises one or more of amino acid residues selected from K8, K14, K47, K60, K69, K70, K75, K77, K83, K91, K100, K101, K135, K138, and K141 of *Bos taurus* β-lactoglobulin, and having non-native sumoylation on one or more of such amino acid residues.

The recombinant milk protein of the invention can be a recombinant β-lactoglobulin comprising an amino acid sequence that comprises one or more of amino acid residues selected from C66, C106, C119, C121, and C160 of *Bos taurus* β-lactoglobulin, and having non-native nitrosylation on one or more of such amino acid residues.

The recombinant milk protein of the invention can be a recombinant β-lactoglobulin comprising an amino acid sequence that comprises one or more of amino acid residues selected from Y20, Y42, Y99, and Y102 of *Bos taurus* β-lactoglobulin, and having non-native tyrosine nitration on one or more of such amino acid residues.

The recombinant milk protein of the invention can be a recombinant β-lactoglobulin comprising an amino acid sequence that comprises one or more of amino acid residues selected from F151 of *Bos taurus* β-lactoglobulin, and having non-native glypiation on such amino acid residue.

The recombinant milk protein of the invention can be a recombinant β-lactoglobulin comprising an amino acid sequence that comprises one or more of amino acid residues selected from C160 of *Bos taurus* β-lactoglobulin, and having non-native farnesylation on such amino acid residue.

The recombinant milk protein of the invention can be a recombinant β-lactoglobulin comprising an amino acid sequence that comprises one or more of amino acid residues selected from C160 of *Bos taurus* β-lactoglobulin, and having non-native geranylgeranylation on such amino acid residue.

The recombinant milk protein of the invention can be a recombinant β-lactalbumin comprising an amino acid sequence that comprises one or more of amino acid residues selected from T4, S22, T29, T30, T33, S34, T38, N44, N45, S47, T48, N56, N57, N66, S69, S70, N71, N74, S76, T86, N102, and S112 of *Bos taurus* α-lactalbumin, and having non-native glycosylation on one or more of such amino acid residues.

The recombinant milk protein of the invention can be a recombinant α-lactalbumin comprising an amino acid sequence that comprises one or more of amino acid residues selected from T4, Y18, S22, T29, T30, T33, S34, Y36, T38, S47, T48, Y50, S69, S70, S76, T86, Y103, and S112 of *Bos taurus* α-lactalbumin, and having non-native phosphorylation on one or more of such amino acid residues.

The recombinant milk protein of the invention can be a recombinant κ-casein comprising an amino acid sequence that comprises one or more of amino acid residues selected from S19, S33, S37, N41, N52, N53, S69, S80, N81, S87, T93, T94, S104, N113, T117, T121, N123, T124, S127, T131, S132, T133, T135, S141, T142, T145, S149, S155, N160, T161, T165, S166, and T167 of *Bos taurus* κ-casein, and having non-native glycosylation on one or more of such amino acid residues.

The recombinant milk protein of the invention can be a recombinant κ-casein comprising an amino acid sequence that comprises one or more of amino acid residues selected from S19, Y25, Y30, S33, Y35, S37, Y42, Y43, Y58, Y60, Y61, S69, S80, S87, T93, T94, S104, T117, T121, T124, S127, T131, S132, T133, T135, S141, T142, T145, S149, S155, T161, T165, S166, and T167 of *Bos taurus* κ-casein, and having non-native phosphorylation on one or more of such amino acid residues.

In another aspect, provided herein is a dairy substitute comprising a milk protein component consisting of a subset of whey milk proteins or of a subset of casein milk proteins or of a mixture of a subset of whey milk proteins and a subset of casein milk proteins, wherein the milk protein component comprises a recombinant β-lactoglobulin having one or more non-native PTMs, a recombinant α-lactalbumin having one or more non-native PTMs, and/or a recombinant κ-casein having one or more non-native PTMs, and wherein the milk protein component imparts or materially contributes to at least one dairy attribute of the dairy substitute.

The dairy substitute according to any of the above, wherein the milk protein component comprises a recombinant β-lactoglobulin according to any of the above.

The dairy substitute according to any of the above, wherein the milk protein component comprises a recombinant α-lactalbumin according to any of the above.

The dairy substitute according to any of the above, wherein the milk protein component comprises a recombinant κ-casein according to any of the above.

The dairy substitute according to any of the above, wherein the milk protein component comprises a mixture of recombinant β-lactoglobulins according to any of the above, wherein the mixture consists of two or more recombinant β-lactoglobulins having one or more different non-native PTMs.

The dairy substitute according to any of the above, wherein the milk protein component comprises a mixture of recombinant α-lactalbumins according to any of the above, wherein the mixture consists of two or more recombinant α-lactalbumins having one or more different non-native PTMs.

The dairy substitute according to any of the above, wherein the milk protein component comprises a mixture of recombinant κ-caseins according to any of the above, wherein the mixture consists of two or more recombinant κ-caseins having one or more different non-native PTMs.

The dairy substitute according to any of the above, wherein the milk protein component comprises a mixture of a recombinant β-lactoglobulin according to any of the above and a native and/or recombinant α-lactalbumin, such as, for example, a recombinant α-lactalbumin according to any of the above.

The dairy substitute according to any of the above, wherein the milk protein component comprises a mixture of a recombinant β-lactoglobulin according to any of the above and a native and/or recombinant κ-casein, such as, for example, a recombinant κ-casein according to any of the above.

The dairy substitute according to any of the above, wherein the milk protein component comprises a mixture of a recombinant α-lactalbumin according to any of the above and a native and/or recombinant κ-casein, such as, for example, a recombinant κ-casein according to any of the above.

The dairy substitute according to any of the above, wherein the milk protein component comprises a mixture of a recombinant β-lactoglobulin according to any of the above and a native and/or recombinant α-lactalbumin and a native and/or recombinant κ-casein, wherein the recombinant α-lactalbumin can be a recombinant α-lactalbumin according to any of the above, and wherein the recombinant κ-casein can be a recombinant κ-casein according to any of the above.

The dairy substitute according to any of the above, wherein the milk protein component further comprises one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein.

The dairy substitute according to any of the above, wherein the milk protein component consists of a recombinant β-lactoglobulin according to any of the above, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein.

The dairy substitute according to any of the above, wherein the milk protein component consists of a recombinant α-lactalbumin according to any of the above, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein.

The dairy substitute according to any of the above, wherein the milk protein component consists of a recombinant κ-casein according to any of the above, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein.

The dairy substitute according to any of the above, wherein the milk protein component consists of a mixture of recombinant β-lactoglobulins according to any of the above, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-52-casein, wherein the mixture consists of two or more recombinant β-lactoglobulins having one or more different non-native PTMs.

The dairy substitute according to any of the above, wherein the milk protein component consists of a mixture of recombinant α-lactalbumins according to any of the above, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein, wherein the mixture consists of two or more recombinant α-lactalbumins having one or more different non-native PTMs.

The dairy substitute according to any of the above, wherein the milk protein component consists of a mixture of recombinant κ-caseins according to any of the above, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein, wherein the mixture consists of two or more recombinant κ-caseins having one or more different non-native PTMs.

The dairy substitute according to any of the above, wherein the milk protein component consists of a mixture of a recombinant β-lactoglobulin according to any of the above, a native and/or recombinant α-lactalbumin, such as, for example, a recombinant α-lactalbumin according to any of the above, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein.

The dairy substitute according to any of the above, wherein the milk protein component consists of a mixture of a recombinant β-lactoglobulin according to any of the above, a native and/or recombinant κ-casein, such as, for example, a recombinant κ-casein according to any of the above, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein.

The dairy substitute according to any of the above, wherein the milk protein component consists of a mixture of a recombinant α-lactalbumin according to any of the above, a native and/or recombinant κ-casein, such as, for example, a recombinant κ-casein according to any of the above, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein.

The dairy substitute according to any of the above, wherein the milk protein component consists of a mixture of a native and/or recombinant β-lactoglobulin and a native and/or recombinant α-lactalbumin and a native and/or recombinant κ-casein, and optionally one or more milk proteins selected from the group consisting of a native and/or recombinant lactoferrin, a native and/or recombinant transferrin, a native and/or recombinant serum albumin, a native and/or recombinant lactoperoxidase, a native and/or recombinant GMP, a native and/or recombinant β-casein, a native and/or recombinant γ-casein, a native and/or recombinant α-S1-casein, and a native and/or recombinant α-S2-casein, wherein the mixture comprises at least one (e.g., one, two, all) of a recombinant β-lactoglobulin according to any of the above, a recombinant α-lactalbumin according to any of the above, and a recombinant κ-casein according to any of the above.

The dairy substitute according to any of the above, wherein the recombinant β-lactoglobulin is at least 80% identical to bovine β-lactoglobulin.

The dairy substitute according to any of the above, wherein the recombinant α-lactalbumin is at least 80% identical to bovine α-lactalbumin.

The dairy substitute according to any of the above, wherein the recombinant κ-casein is at least 80% identical to bovine κ-casein.

The dairy substitute according to any of the above, wherein the recombinant β-lactoglobulin is produced in a recombinant host cell selected from the group consisting of a recombinant fungal host cell (e.g., a recombinant filamentous fungal host cell [e.g., from a genus selected from the group consisting of: *Aspergillus, Candida, Fusarium, Hansenula, Kluyveromyces, Pichia, Saccharomyces, Tetrahymena, Trichoderma, Yarrowia*, and *Zygosaccharomyces*]), a recombinant bacterial host cell, a recombinant algal host cell, or a recombinant plant host cell.

The dairy substitute according to any of the above, wherein the recombinant α-lactalbumin is produced in a recombinant host cell selected from the group consisting of a recombinant fungal host (e.g., a recombinant filamentous fungal host cell [e.g., from a genus selected from the group consisting of: *Aspergillus, Candida, Fusarium, Hansenula, Kluyveromyces, Pichia, Saccharomyces, Tetrahymena, Trichoderma, Yarrowia,* and *Zygosaccharomyces*]), a recombinant bacterial host cell, a recombinant algal host cell, or a recombinant plant host cell.

The dairy substitute according to any of the above, wherein the recombinant κ-casein is produced in a recombinant host cell selected from the group consisting of a recombinant fungal host cell (e.g., a recombinant filamentous fungal host cell [e.g., from a genus selected from the group consisting of: *Aspergillus, Candida, Fusarium, Hansenula, Kluyveromyces, Pichia, Saccharomyces, Tetrahymena, Trichoderma, Yarrowia,* and *Zygosaccharomyces*]), a recombinant bacterial host cell, a recombinant algal host cell, or a recombinant plant host cell.

The dairy substitute according to any of the above, wherein the recombinant β-lactoglobulin comprises a non-native reactive site.

The dairy substitute according to any of the above, wherein the recombinant α-lactalbumin comprises a non-native reactive site.

The dairy substitute according to any of the above, wherein the recombinant κ-casein comprises a non-native reactive site.

The dairy substitute according to any of the above, wherein the recombinant β-lactoglobulin lacks a reactive site that is present in the corresponding native milk protein.

The dairy substitute according to any of the above, wherein the recombinant α-lactalbumin lacks a reactive site that is present in the corresponding native milk protein.

The dairy substitute according to any of the above, wherein the recombinant κ-casein lacks a reactive site that is present in the corresponding native milk protein.

The dairy substitute according to any of the above, wherein the recombinant β-lactoglobulin comprises a milk protein repeat.

The dairy substitute according to any of the above, wherein the recombinant α-lactalbumin comprises a milk protein repeat.

The dairy substitute according to any of the above, wherein the recombinant κ-casein comprises a milk protein repeat.

The dairy substitute according to any of the above, wherein the dairy substitute further comprises a non-milk protein, such as, for example, a non-milk protein obtained from a plant (e.g., pea, potato, *faba* bean, soybean, canola).

The dairy substitute according to any of the above, wherein the dairy substitute comprises between about 0.1% and about 100%, between about 1% and about 70%, between about 5% and about 40%, or between about 10% and about 25% by mass of a milk protein component according to any of the above.

The dairy substitute according to any of the above, wherein the dairy substitute is a powder.

The dairy substitute according to any of the above, wherein the dairy substitute comprises a milk protein polymer network.

In another aspect, provided herein is a composition comprising a dairy substitute according to any of the above, wherein the dairy substitute imparts on or materially contributes in the composition to an attribute imparted by milk in a comparable composition.

The composition according to any of the above, wherein the composition is a food product.

The composition according to any of the above, wherein the food product is a dairy product.

The composition according to any of the above, wherein the food product is a dairy substitute product.

The composition according to any of the above, wherein the composition comprises a milk protein polymer network.

The composition according to any of the above, wherein the composition comprises between about 0.001% and 90%, or between about 1% and 50%, or between about 10% and 30% by mass of a dairy substitute according to any of the above.

In another aspect provided herein is a method for producing a dairy substitute according to any of the above, wherein the method comprises the step of obtaining one or more of the recombinant milk proteins according to any of the above.

The method according to any of the above, wherein the method comprises the step of culturing a recombinant host cell capable of producing a recombinant β-lactoglobulin in a culture medium comprising a carbon source that consists of glucose, wherein the recombinant β-lactoglobulin produced by the recombinant host cell has non-native O-linked glycosylation on one or more of amino acid residues T4.

The method according to any of the above, wherein the method comprises the step of culturing a recombinant host cell capable of producing a recombinant β-lactoglobulin in a culture medium comprising a carbon source that consists of glucose, wherein the recombinant β-lactoglobulin produced by the recombinant host cell has non-native O-linked glycosylation on amino acid residue T97.

The method according to any of the above, wherein the method comprises the step of culturing a recombinant host cell capable of producing a recombinant β-lactoglobulin in a culture medium comprising a carbon source that consists of lactose and spent grain, wherein the recombinant β-lactoglobulin produced by the recombinant host cell has non-native O-linked glycosylation on amino acid residue T97.

The method according to any of the above, wherein the method comprises the step of culturing a recombinant host cell capable of producing a recombinant β-lactoglobulin in a culture medium comprising a carbon source that consists of glucose, wherein the recombinant β-lactoglobulin produced by the recombinant host cell has non-native O-linked glycosylation on one or more of amino acid residues S27, T6, T97, S116, and T125.

The method according to any of the above, wherein the method comprises the step of culturing a recombinant host cell capable of producing a recombinant β-lactoglobulin in a culture medium comprising a carbon source that consists of lactose and spent grain, wherein the recombinant β-lactoglobulin produced by the recombinant host cell has non-native O-linked glycosylation on one or more of amino acid residues S27, T6, T97, S116, and T125.

The method of according to any of the above, wherein the method comprises the step of culturing a recombinant host cell capable of producing a recombinant β-lactoglobulin at a temperature that is at least 30° C., wherein the recombinant β-lactoglobulin produced by the recombinant host cell has O-linked glycosylation on amino acid residue T49.

The method of according to any of the above, wherein the method comprises the step of culturing a recombinant host cell capable of producing a recombinant β-lactoglobulin at a temperature of about 28° C., wherein the recombinant β-lactoglobulin produced by the recombinant host cell has O-linked glycosylation on amino acid residue T6.

DETAILED DESCRIPTION OF THE INVENTION

The terminology and description used herein is for the purpose of describing particular embodiments only, and is not intended to limit the invention. Unless defined otherwise, all technical and scientific terms used herein have the same meaning as is commonly understood by one of ordinary skill in the art to which this disclosure pertains. Further, unless otherwise required by context, singular terms shall include the plural, and plural terms shall include the singular.

DEFINITIONS

The terms "a" and "an" and "the" and similar references as used herein refer to both the singular and the plural (e.g., meaning "at least one" or "one or more"), unless otherwise indicated herein or clearly contradicted by context. For example, the term "a compound" or "at least one compound" or "one or more compounds" may include a plurality of compounds, including mixtures thereof.

The term "about" as used herein in conjunction with a stated numerical value or range of numerical values is meant to encompass variations of the stated numerical value or range of numerical values (i.e., denoting somewhat more or somewhat less than the stated numerical value or range of numerical values, to within a range of ±20%, ±10%, ±5%, ±1%, ±0.5%, ±0.1%, or ±one standard deviation of the stated value or range of numerical values).

The term "and/or" as used herein refers to multiple components in combination with or exclusive of one another. For example, "x, y, and/or z" can refer to "x" alone, "y" alone, "z" alone, "x, y, and z", "(x and y) or z", "(x and z) or y", "(y and z) or x", "x and y" alone, "x and z" alone, "y and z" alone, or "x or y or z".

Amino acids can be referred to herein by their single-letter codes, amino acid names, or three-letter codes. The single-letter codes, amino acid names, and three-letter codes are as follows: G—Glycine (Gly), P—Proline (Pro), A—Alanine (Ala), V—Valine (Val), L—Leucine (Leu), I—Isoleucine (Ile), M—Methionine (Met), C—Cysteine (Cys), F—Phenylalanine (Phe), Y—Tyrosine (Tyr), W—Tryptophan (Trp), H—Histidine (His), K—Lysine (Lys), R—Arginine (Arg), Q—Glutamine (Gln), N—Asparagine (Asn), E—Glutamic Acid (Glu), D—Aspartic Acid (Asp), S—Serine (Ser), T—Threonine (Thr). Amino acid residues are denoted by a first letter for the amino acid, followed by a number that specifies the position of the amino acid in a reference sequence (e.g., a UniProt sequence).

The terms "at least" and "one or more" as used herein refer to one, two, three, four, five, six, seven, eight, nine, ten, at least one, at least two, at least three, at least four, at least five, at least six, at least seven, at least eight, at least nine, at least ten, or more, or all of the elements subsequently listed.

The term "comparable composition" or "comparable food product" as used herein refer to a composition or food product, respectively, that is produced by a method that is identical to the method used to produce the composition or food product, respectively, that is compared to the "comparable composition" or "comparable food product", respectively, except that the "comparable composition" or "comparable food product", respectively, comprises a corresponding native milk protein in place of a recombinant milk protein as provided herein.

The term "component" as used herein refers to one unit (e.g., one protein) or more than one unit (e.g., two or more proteins) that are grouped together unless specifically stated otherwise. The grouping is to be understood as only a symbolic grouping, and thus does not require physical interaction between the units (although physical interaction is not ruled out by the use of the term "component").

The term "dairy attribute" as used herein refers to an attribute of a dairy product; or to an attribute that is imparted onto a composition (e.g., a food product) by milk (e.g., whole milk [at least 3.25% milk fat], partly skimmed milk [from 1% to 2% milk fat], skim milk [less than 0.2% milk fat], cooking milk, condensed milk, flavored milk, cow milk, goat milk, sheep milk, dried milk, evaporated milk, milk foam, milk powders (e.g., whole milk powder, skim milk powder, fat-filled milk powder (i.e., milk powder comprising plant fat in place of all or some animal fat), milk protein concentrate (i.e., protein content of at least 80% by weight; e.g., milk protein concentrate, demineralized milk protein concentrate, milk protein hydrolysate, whey protein concentrate, demineralized whey protein concentrate, whey protein hydrolysate, β-lactoglobulin concentrate, α-lactalbumin concentrate, casein concentrate), or milk protein isolate (i.e., protein content of at least 90% by weight; e.g., milk protein isolate, whey protein isolate, demineralized whey protein isolate, β-lactoglobulin isolate, α-lactalbumin isolate, casein isolate)). Typical comparisons disclosed herein are made with milk derived from cow.

The term "dairy product" as used herein refers to milk (e.g., whole milk [at least 3.25% milk fat], partly skimmed milk [from 1% to 2% milk fat], skim milk [less than 0.2% milk fat], cooking milk, condensed milk, flavored milk, goat milk, sheep milk, dried milk, evaporated milk, milk foam), and products derived from milk, including but not limited to yogurt (e.g., whole milk yogurt [at least 6 grams of fat per 170 g], low-fat yogurt [between 2 and 5 grams of fat per 170 g], nonfat yogurt [0.5 grams or less of fat per 170 g], greek yogurt [strained yogurt with whey removed], whipped yogurt, goat milk yogurt, Labneh sheep milk yogurt, yogurt drinks [e.g., whole milk Kefir, low-fat milk Kefir], Lassi), cheese (e.g., whey cheese such as ricotta; pasta filata cheese such as mozzarella; semi-soft cheese such as Havarti and Muenster; medium-hard cheese such as Swiss and Jarlsberg; hard cheese such as Cheddar and Parmesan; washed curd cheese such as Colby and Monterey Jack; soft ripened cheese such as Brie and Camembert; fresh cheese such as cottage cheese, feta cheese, cream cheese, and curd), processed cheese, processed cheese food, processed cheese product, processed cheese spread, enzyme-modulated cheese; cold-pack cheese), dairy-based sauces (e.g., salad dressing, bechamel sauce, fresh sauces, frozen sauces, refrigerated sauces, shelf stable sauces), dairy spreads (e.g., low-fat spread, low-fat butter), cream (e.g., dry cream, heavy cream, light cream, whipping cream, half-and-half, coffee whitener, coffee creamer, sour cream, crème fraiche), frozen confections (e.g., ice cream, smoothie, milk shake, frozen yogurt, sundae, gelato, custard), dairy desserts (e.g., fresh, refrigerated, or frozen), butter (e.g., whipped butter, cultured butter), dairy powders (e.g., whole milk powder, skim milk powder, fat-filled milk powder (i.e., milk powder comprising plant fat in place of all or some animal fat), infant formula, protein concentrate (e.g., milk protein concentrate, whey protein concentrate, demineralized whey protein concentrate, β-lactoglobulin concentrate, α-lactalbumin concentrate, glycomacropeptide concentrate, casein concentrate), protein isolate (e.g., milk protein isolate, whey protein isolate, demineralized whey protein isolate, β-lactoglobulin isolate, α-lactalbumin isolate, glycomacropeptide isolate, casein isolate), nutritional supplements, texturizing blends, flavoring blends, coloring blends), ready-to-drink or ready-to-mix products (e.g., fresh, refrigerated, or shelf stable dairy protein beverages, weight loss beverages, nutritional beverages, sports recovery beverages, and energy drinks), puddings, gels, chewables, crisps, bars (e.g., nutrition bars, protein bars), and fermented dairy products (e.g., yoghurt, cheese, sour cream, cultured buttermilk, cultured butter, cultured butter oil).

The term "essentially free of" as used herein refers to the indicated component being either not detectable in the indicated composition by common analytical methods, or to the indicated component being present in such trace amount as to not be functional. The term "functional" as used in this context refers to not contributing to properties of the composition comprising the trace amount of the indicated component, or to not having activity (e.g., enzymatic activity) in the indicated composition comprising the trace amount of the indicated component, or to not having health-adverse effects upon consumption of the composition comprising the trace amount of the indicated component.

The term "filamentous fungus" as used herein refers to an organism from the filamentous form of the subdivision Eumycota and Oomycota (as defined by Hawksworth et al., In, Ainsworth and Bisby's Dictionary of The Fungi, 8th edition, 1995, CAB International, University Press, Cambridge, UK). A filamentous fungus is distinguished from a yeast by its hyphal elongation during vegetative growth. The term "filamentous fungal cell" as used herein refers to a cell that is obtained from a filamentous fungus.

The term "food product" as used herein refers to a composition that can be ingested by a human or an animal for dietary purposes (i.e., without ill health effects but with significant nutritional and/or caloric intake due to uptake of digested material in the gastrointestinal tract), including a domesticated animal (e.g., dog, cat), farm animal (e.g., cow, pig, horse), and wild animal (e.g., non-domesticated predatory animal). The term includes compositions that can be combined with or added to one or more other ingredients to make a food product that can be ingested by a human or an animal.

The term "fungus" as used herein refers to organisms of the phyla Ascomycotas, Basidiomycota, Zygomycota, and Chythridiomycota, Oomycota, and Glomeromycota. It is understood, however, that fungal taxonomy is continually evolving, and therefore this specific definition of the fungal kingdom may be adjusted in the future. The term "fungal cell" as used herein refers to a cell that is obtained from a fungus.

The term "host cell" as used herein refers not only to the particular subject cell but to the progeny of such cell. Because certain modifications may occur in succeeding generations due to either mutation or environmental influences, such progeny may not, in fact, be identical to the parent cell, but are still included within the scope of the term "host cell" as used herein.

The term "identical" as used herein in the context of polynucleotide or polypeptide sequences refers to the residues in the two sequences that are the same when aligned for maximum correspondence. There are a number of different algorithms known in the art that can be used to measure polynucleotide or polypeptide sequence identity. For instance, sequences can be compared using FASTA (e.g., using its default parameters as provided in the Wisconsin Package Version 10.0, Genetics Computer Group (GCG), Madison, WI), Gap (e.g., using its default parameters as provided in the Wisconsin Package Version 10.0, GCG, Madison, WI), Bestfit, ClustalW (e.g., using default parameters of Version 1.83), or BLAST (e.g., using reciprocal BLAST, PSI-BLAST, BLASTP, BLASTN) (see, for example, Pearson. 1990. Methods Enzymol. 183:63; Altschul et al. 1990. J. Mol. Biol. 215:403).

The terms "including," "includes," "having," "has," "with," or variants thereof as used herein are intended to be inclusive in a manner similar to the term "comprising".

The term "materially contribute" as used herein refers to the indicated component contributing to an attribute of a composition to such extent that in the absence of the component (e.g., in a reference composition that is identical to the composition except that it lacks the indicated component) the attribute is at least 10%, at least 20%, at least 30%, at least 40%, or at least 50% less present/active/measurable.

The term "milk protein" as used herein refers to a polypeptide that comprises a sequence of at least 20 (e.g., at least 20, at least 30, at least 40, at least 50, at least 60, at least 70, at least 80, at least 90, at least 100, at least 150) amino acids that is at least 50% (e.g., at least 50%, at least 55%, at least 60%, at least 65%, at least 70%, at least 75%, at least 80%, at least 85%, at least 90%, at least 95%, at least 99%, 100%) identical to a sequence of amino acids in a protein natively found in a mammal-produced milk (i.e., a protein that is native to a mammal-produced milk; e.g., a native whey protein or a native casein). Non-limiting examples of milk proteins include α-lactalbumin (e.g., amino acids 20-142 of UniProt sequence P00709, P00711, P00712, or P09462), β-lactoglobulin (amino acids 17-178 of UniProt sequence P02754, amino acids 19-180 of UniProt sequence P67976 or P02756), lactoferrin (e.g., amino acids 20 to 708 of UniProt sequence P24627, D3G9G3, or Q29477; amino acids 20 to 710 of UniProt sequence P02788), transferrin (e.g., amino acids 20 to 704 of UniProt sequence Q29443, or W5PF65; amino acids 20 to 698 of UniProt sequence A0A452FJF9 or P02787), serum albumin (e.g., amino acids 25 to 607 of UniProt sequence P02769 or P14639; amino acids 19 to 608 of UniProt sequence A0A452F7Y5; amino acids 25 to 609 of UniProt sequence P02768), lactoperoxidase, glycomacropeptide (GMP), β-casein (e.g., amino acids 16 to 224 of UniProt sequence P02666; amino acids 16 to 222 of UniProt sequence P11839 or P33048; amino acids 16 to 226 of P05814), γ-casein, κ-casein (e.g., amino acids 22 to 190 of UniProt sequence P02668; amino acids 22 to 192 of UniProt sequence P02669 or P02670; amino acids 21 to 182 of UniProt sequence P07498), α-S1-casein (e.g., amino acids 16 to 214 of UniProt sequence P02662, P04653, or P18626; amino acids 16 to 185 of UniProt sequence P47710), and α-S2-casein (e.g., amino acids 16 to 222 of UniProt sequence P02663; amino acids 16 to 223 of UniProt sequence P04654 or P33049). Non-limiting examples of polynucleotide and polypeptide sequences encoding milk proteins are disclosed in PCT filing PCT/US2015/046428 filed Aug. 21, 2015, and PCT filing PCT/US2017/48730 filed Aug. 25, 2017, which are hereby incorporated herein, in their entireties.

The term "native" as used herein refers to what is produced in nature (e.g., a cell that is not genetically modified by a human, and that is maintained under conditions [e.g., level of oxygenation, pH, salt concentration, temperature, and nutrient (e.g., carbon, nitrogen, sulfur) availability] that are not defined by a human).

The term "non-milk protein" as used herein refers to a polypeptide not found in a mammal-produced milk (i.e., a protein that is not native to a mammal-produced milk).

The terms "optional" or "optionally" as used herein refer to a feature or structure being present or not, or an event or circumstance occurring or not. The description includes instances in which a feature or structure is present, instances in which the feature or structure is absent, instances in which an event or circumstance occurs, and instances in which an event or circumstance does not occur.

The term "polynucleotide" as used herein refers to both sense and antisense strands of RNA, cDNA, genomic DNA, and synthetic forms and mixed polymers of the above. A polynucleotide may be modified chemically or biochemically or may contain non-natural or derivatized nucleotide bases. Such modifications include, for example, labels; methylation; substitution of one or more of the naturally occurring nucleotides with an analog; internucleotide modifications such as uncharged linkages (e.g., methyl phosphonates, phosphotriesters, phosphoramidates, carbamates), charged linkages (e.g., phosphorothioates, phosphorodithioates), pendent moieties (e.g., polypeptides), intercalators (e.g., acridine, psoralen), chelators, alkylators, and modified linkages (e.g., alpha anomeric nucleic acids). Examples of modified nucleotides are described in the art (see, for example, Malyshev et al. 2014. Nature 509:385; Li et al. 2014. J. Am. Chem. Soc. 136:826). Also included are synthetic molecules that mimic polynucleotides in their ability to bind to a designated sequence via hydrogen bonding or other chemical interaction. Such molecules are known in the art and include, for example, molecules in which peptide linkages substitute for phosphate linkages in the backbone of the molecule. Other modifications can include, for example, analogs in which the ribose ring contains a bridging moiety or other structure such as the modifications found in "locked" polynucleotides.

The term "polypeptide" as used herein refers to a polymeric form of amino acids.

The term "protein" as used herein refers to a polypeptide of any length, which can include polypeptides comprising coded and non-coded amino acids, polypeptides comprising amino acids that occur in nature and those that do not occur in nature, polypeptides comprising chemically or biochemically modified or derivatized amino acids, and polypeptides comprising modified peptide backbones.

The term "post-translational modification", or its acronym "PTM", as used herein refers to a modifications to a protein after biosynthesis (e.g., the covalent attachment of a chemical group to a protein). PTM can occur on the amino acid side chain of the protein or at its C- or N-termini. Non-limiting examples of suitable PTMs include glycosylation (i.e., covalent attachment to proteins of glycan groups (e.g., monosaccharides, disaccharides, polysaccharides, linear glycans, branched glycans, glycans with galf residues, glycans with sulfate and/or phosphate residues, D-glucose, D-galactose, D-mannose, L-fucose, N-acetyl-D-galactose amine, N-acetyl-D-glucose amine, N-acetyl-D-neuraminic acid, galactofuranose, phosphodiesters, N-acetylglucosamine, N-acetylgalactosamine, sialic acid, and combinations thereof; see, for example, Deshpande et al. 2008. Glycobiology 18(8):626) via C-linkage (i.e., C-glycosylation), N-linkage (i.e., N-glycosylation), or O-linkage (i.e., O-glycosylation), or via glypiation (i.e., addition of a glycosylphosphatidylinositol anchor) or phosphoglycosylation (i.e., linked through the phosphate of a phospho-serine)), phosphorylation (i.e., covalent attachment to proteins of phosphate groups), alkylation (i.e., covalent attachment to proteins of alkane groups (e.g., methane group in methylation)), lipidation (i.e., covalent attachment of a lipid group (e.g., isoprenoid group in prenylation and isoprenylation (e.g., farnesol group in farnesylation, geraniol group in geranylation, geranylgeraniol group in geranylgeranylation), fatty acid group in fatty acylation (e.g., myristic acid in myristoylation, palmitic acid in palmitoylation), glycosylphosphatidylinositol anchor in glypiation)), hydroxylation (i.e., covalent attachment of a hydroxide group), sumoylation (i.e., attachment to proteins of Small Ubiquitin-like Modifier (or SUMO) protein), nitrosylation (i.e., attachment to proteins of an NO group (e.g., S-nitrosylation)), nitrosothiolation (i.e., attachment to a cysteine thiol in a protein of an NO group (e.g., S-nitrosothiol)), glutathionylation (i.e., attachment to a cysteine thiol in a protein of a glutathione group (e.g., S-glutathionylation)), and tyrosine nitration (i.e., attachment to tyrosine residues of proteins of nitrate groups). PTMs of a recombinant milk protein can be native PTMs (e.g., mammalian PTMs), non-native PTMs, or mixtures of at least one native PTM and at least one non-native PTM. The term "non-native PTM" as used herein refers to a difference in one or more location(s) of one or more PTMs (e.g., glycosylation, phosphorylation) in a protein, and/or a difference in the type of one or more PTMs at one or more location(s) in a protein compared to the protein as it exists in a mammal-derived milk (i.e., the protein having "native PTMs"). The type and/or number and/or absence of and/or location of PTMs in a recombinant milk protein can confer or materially impact a dairy attribute in a composition comprising the recombinant milk protein.

The term "purifying" as used herein refers to a protein being substantially separated from chemicals and cellular components (e.g., cell walls, membrane lipids, chromosomes, other proteins). The term does not require (albeit allows) that the protein be separated from all other chemicals and cellular components.

The term "protein concentrate" as used herein refers to a protein material that is obtained upon removal of at least a portion (or a substantial portion) of one or more of carbohydrates, lipids, ash, and other minor constituents. It typically comprises between 30% and 80% (e.g., between 30% and 80%, 75%, 70%, 65%, 60%, 55%, 50%, 45%, 40%, or 35%; between 35% and 80%, 75%, 70%, 65%, 60%, 55%, 50%, 45%, or 40%; between 40% and 80%, 75%, 70%, 65%, 60%, 55%, 50%, or 45%; between 45% and 80%, 75%, 70%, 65%, 60%, 55%, or 50%; between 50% and 80%, 75%, 70%, 65%, 60%, or 55%; between 55% and 80%, 75%, 70%, 65%, or 60%; between 60% and 80%, 75%, 70%, or 65%; between 65% and 80%, 75%, or 70%; between 70% and 80%, or 75%; or between 75% and 80%) by weight of protein.

The term "protein isolate" as used herein refers to a protein material that is obtained upon removal of at least a portion (or a substantial portion) of one or more of polysaccharides, soluble carbohydrates, ash, and other minor constituents. It typically comprises at least 80% (i.e., at least 80%, at least 85%, at least 95%, at least 99%) by weight of protein.

The term "recombinant" as used herein in reference to a protein (e.g., a milk protein) refers to a protein that is produced recombinantly (e.g., that is produced by a recombinant host cell).

The term "recombinant α-lactalbumin" as used herein refers to a recombinantly produced polypeptide that comprises a sequence of at least 20 (e.g., at least 20, at least 30, at least 40, at least 50, at least 60, at least 70, at least 80, at least 90, at least 100, at least 150) amino acids that is at least 50% (e.g., at least 50%, at least 55%, at least 60%, at least 65%, at least 70%, at least 75%, at least 80%, at least 85%, at least 90%, at least 95%, at least 99%, 100%) identical to a sequence of amino acids in a native α-lactalbumin (e.g., native *Bos taurus* α-lactalbumin [e.g., amino acids 20 to 142 of UniProt sequence P00711], native *Ovis aries* α-lactalbumin [e.g., amino acids 20 to 142 of UniProt sequence P09462], native *Capra hircus* α-lactalbumin [e.g., amino acids 20 to 142 of UniProt sequence P00712], native *Homo sapiens* α-lactalbumin [e.g., amino acids 20 to 142 of UniProt sequence P00709]).

The term "recombinant β-lactoglobulin" as used herein refers to a recombinantly produced polypeptide that comprises a sequence of at least 20 (e.g., at least 20, at least 30, at least 40, at least 50, at least 60, at least 70, at least 80, at least 90, at least 100, at least 150) amino acids that is at least 50% (e.g., at least 50%, at least 55%, at least 60%, at least 65%, at least 70%, at least 75%, at least 80%, at least 85%, at least 90%, at least 95%, at least 99%, 100%) identical to a sequence of amino acids in a native β-lactoglobulin (e.g., a native *Bos taurus* β-lactoglobulin [e.g., amino acids 17 to 178 of UniProt sequence P02754], a native *Ovis aries* β-lactoglobulin [e.g., amino acids 19 to 180 of UniProt sequence P67976], a native *Capra hircus* β-lactoglobulin [e.g., amino acids 19 to 180 of UniProt sequence P02756]).

The term "recombinant host cell" as used herein refers to a host cell that comprises a recombinant polynucleotide. Thus, for example, a recombinant host cell may produce a polynucleotide or polypeptide not found in the native (non-recombinant) form of the host cell, or a recombinant host cell may produce a polynucleotide or polypeptide at a level that is different from that in the native (non-recombinant) form of the host cell. It should be understood that such term is intended to refer not only to the particular subject cell but also to the progeny of such a cell. Because certain modifications may occur in succeeding generations due to either mutation or environmental influences, such progeny may not be identical to the parent cell, but are still included within the scope of the term "recombinant host cell" as used herein.

The term "recombinant polynucleotide" as used herein refers to a polynucleotide that has been removed from its naturally occurring environment, a polynucleotide that is not associated with all or a portion of a polynucleotide abutting or proximal to the polynucleotide when it is found in nature, a polynucleotide that is operatively linked to a polynucleotide that it is not linked to in nature, a polynucleotide that is altered, or a polynucleotide that does not occur in nature. The term can be used, e.g., to describe cloned DNA isolates, or a polynucleotide comprising a chemically synthesized nucleotide analog. A polynucleotide is also considered "recombinant" if it contains a genetic modification that does not naturally occur. For instance, an endogenous polynucleotide is considered a "recombinant polynucleotide" if it contains an insertion, deletion, or substitution of one or more nucleotides that is introduced artificially (e.g., by human intervention). Such modification can introduce into the polynucleotide a point mutation, substitution mutation, deletion mutation, insertion mutation, missense mutation, frameshift mutation, duplication mutation, amplification mutation, translocation mutation, or inversion mutation. The term includes a polynucleotide in a host cell's chromosome, as well as a polynucleotide that is not in a host cell's chromosome (e.g., a polynucleotide that is comprised in an episome). A recombinant polynucleotide in a host cell or organism may replicate using the in vivo cellular machinery of the host cell; however, such recombinant polynucleotide, although subsequently replicated intracellularly, is still considered recombinant for purposes of this invention.

The term "recombinant κ-casein" as used herein refers to a polypeptide that comprises a sequence of at least 20 (e.g., at least 20, at least 30, at least 40, at least 50, at least 60, at least 70, at least 80, at least 90, at least 100, at least 150) amino acids that is at least 50% (e.g., at least 50%, at least 55%, at least 60%, at least 65%, at least 70%, at least 75%, at least 80%, at least 85%, at least 90%, at least 95%, at least 99%, 100%) identical to a sequence of amino acids in *Bos taurus* κ-casein (e.g., a native *Bos taurus* κ-casein [e.g., amino acids 22 to 190 of UniProt sequence P02668], a native *Ovis aries* κ-casein [e.g., amino acids 22 to 192 of UniProt sequence P02669], a native *Capra hircus* κ-casein [e.g., amino acids 22 to 192 of UniProt sequence P02670], a native *Home sapiens* κ-casein [e.g., amino acids 21 to 182 of UniProt sequence P07498]).

The term "yeast" as used herein refers to organisms of the order Saccharomycetales. Vegetative growth of yeast is by budding/blebbing of a unicellular thallus, and carbon catabolism may be fermentative. The term "yeast cell" as used herein refers to a cell that is obtained from a yeast.

The term "% by mass" as used herein refers to a percentage value for a mass as determined in a hydrated composition, such that the composition includes the mass of powder as well as the mass of the hydrating agent, with 100% fixed as the percentage value for the entire hydrated composition. In embodiments in which the egg replacer provided herein is in powder form (to which the mass of the hydrating agent will be added at a later time), the term refers to a percentage value for a mass as determined relative to the eventual entire hydrated composition (with 100% fixed as the percentage value for that entire eventual hydrated composition).

The term "% by dry mass" as used herein in context of a hydrated composition (i.e., a composition comprising water) refers to a percentage value for a mass as determined relative to the total dry mass that would remain if the hydrated composition were to have substantially all water removed, with 100% fixed as the percentage value for that total dry mass. In context of a dry composition (e.g., a powder), the term "% by dry mass" as used herein refers to a percentage value for a mass as determined relative to the total mass of the powdered composition, with 100% fixed as the percentage value for that total dry mass.

Recitation of ranges of values herein are merely intended to serve as a shorthand method of referring individually to each separate value (fractional or integral) falling within the range inclusive of the recited minimum and maximum value, unless otherwise indicated herein, and each separate value is incorporated into the specification as if it were individually recited herein. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of less than or equal to 10. It should further be understood that all ranges and quantities described below are approximations and are not intended to limit the invention. Where ranges and numbers are used these can be approximate to include statistical ranges or measurement errors or variation. In some embodiments, for instance, measurements could be plus or minus 10%.

Recombinant Milk Protein Having Non-Native Post-Translational Modification

In one aspect, provided herein is a recombinant milk protein that comprises a non-native post-translational modification (PTM).

Recombinant milk proteins are desirable as they provide advantages in production compared to non-recombinant, conventional production of native milk proteins from milk extracted from live animals (e.g., cow, goat), including but not limited to: independence from the productivity of animals; independence from market uncertainties due to outbreaks of disease among animals; more limited negative impact on the environment (e.g., smaller natural resources requirements [e.g., less water, land, energy used], lower carbon dioxide production); no negative impact on animal welfare (e.g., no animal confinement, force feeding, or hormone treatment); mitigation of supply chain and production risk (e.g., use of recombinant proteins providing supply chain variations and increased flexibility in production methods); and lower production costs.

Moreover, recombinant milk proteins with non-native PTMs are desirable as non-native PTMs can have altered properties compared to their native forms, and can be used to provide compositions with novel, engineered attributes. As a non-limiting example, a recombinant milk protein with a non-native PTM can have a better solubility than its native form, which can make such recombinant milk protein more suitable for production of certain food products (e.g., dairy-like beverages). A recombinant milk protein with a non-native PTM can also be less allergenic, and a recombinant milk protein that lacks an allergenic epitope can be more suitable for production of compositions that are edible or ingestible (e.g., food products, pharmaceutical formulations, hemostatic products). As a further non-limiting example, a recombinant milk protein provided herein can have improved digestibility (i.e., rate at which a composition is degraded in a human or other animal intestinal tract) compared to its native form, which also can make such recombinant milk protein less allergenic and/or more suitable for production of food products.

Recombinant β-Lactoglobulin Having Non-Native PTM

In some embodiments, the recombinant milk protein provided herein is a recombinant β-lactoglobulin comprising a non-native PTM.

In some embodiments, the recombinant β-lactoglobulin provided herein comprises an amino acid sequence that comprises one or more of amino acid residues selected from T4, T6, T18, S21, S27, S30, S36, T49, T76, T97, S110, S116, T125, S150, N152, and T154 of Bos taurus β-lactoglobulin, and has non-native glycosylation on one or more of such amino acid residues (i.e., has a bound glycan group that is not bound to the same amino acid residue in native Bos taurus β-lactoglobulin, and/or does not have a bound glycan group that is bound to the same amino acid residue in native Bos taurus β-lactoglobulin, and/or has a different type of bound glycan group than the type of glycan group that is bound to the same amino acid residue in native Bos taurus β-lactoglobulin).

In some embodiments, the recombinant β-lactoglobulin provided herein has an amino acid sequence that comprises amino acid residue N152 of Bos taurus β-lactoglobulin, and has non-native N-glycosylation on such amino acid residue (such as, for example, a bound glycan group comprising at least one hexose molecule).

In some embodiments, the recombinant β-lactoglobulin provided herein has an amino acid sequence that comprises one or more of amino acid residues selected from T4, T6, T18, S21, S27, S30, S36, T49, T97, S110, S116, T125, S150, and T154 of Bos taurus β-lactoglobulin, and has non-native O-glycosylation on one or more of such amino acid residues (such as, for example, a bound glycan group comprising at least one hexose molecule).

In some embodiments, the recombinant β-lactoglobulin provided herein has an amino acid sequence that comprises one or more of amino acid residues selected from T4, T6, T18, Y20, S21, S27, S30, S36, Y42, T49, T76, T97, Y99, Y102, S110, S116, T125, S150, and T154 of Bos taurus β-lactoglobulin, and has non-native phosphorylation on one or more of such amino acid residues.

In some embodiments, the recombinant β-lactoglobulin provided herein has an amino acid sequence that comprises one or more of amino acid residues selected from K8, K14, R40, K47, K60, K69, K70, K75, K77, K83, K91, K100, K101, R124, K135, K138, K141, and R148 of Bos taurus β-lactoglobulin, and has non-native methylation on one or more of such amino acid residues.

In some embodiments, the recombinant β-lactoglobulin provided herein has an amino acid sequence that comprises one or more of amino acid residues selected from C66, C106, C119, C121, and C160 of Bos taurus β-lactoglobulin, and has non-native palmitoylation on one or more of such amino acid residues.

In some embodiments, the recombinant β-lactoglobulin provided herein has an amino acid sequence that comprises one or more of amino acid residues selected from K8, K14, K47, K60, K69, K70, K75, K77, K83, K91, K100, K101, K135, K138, and K141 of Bos taurus β-lactoglobulin, and has non-native sumoylation on one or more of such amino acid residues.

In some embodiments, the recombinant β-lactoglobulin provided herein has an amino acid sequence that comprises one or more of amino acid residues selected from C66, C106, C119, C121, and C160 of Bos taurus β-lactoglobulin, and has non-native nitrosylation on one or more of such amino acid residues.

In some embodiments, the recombinant β-lactoglobulin provided herein has an amino acid sequence that comprises one or more of amino acid residues selected from Y20, Y42, Y99, and Y102 of Bos taurus β-lactoglobulin, and has non-native tyrosine nitration on one or more of such amino acid residues.

In some embodiments, the recombinant β-lactoglobulin provided herein has an amino acid sequence that comprises amino acid residue F151 of Bos taurus β-lactoglobulin, and has non-native glypiation on such amino acid residue.

In some embodiments, the recombinant β-lactoglobulin provided herein has an amino acid sequence that comprises amino acid residue C160 of Bos taurus β-lactoglobulin, and has non-native farnesylation on such amino acid residue.

In some embodiments, the recombinant β-lactoglobulin provided herein has an amino acid sequence that comprises amino acid residue C160 of Bos taurus β-lactoglobulin, and has non-native geranylgeranylation on such amino acid residue.

Recombinant α-Lactalbumin Having Non-Native PTM

In some embodiments, the recombinant milk protein provided herein is a recombinant α-lactalbumin comprising a non-native PTM.

In some embodiments, the recombinant α-lactalbumin provided herein has an amino acid sequence that comprises one or more of amino acid residues selected from T4, S22, T29, T30, T33, S34, T38, N44, N45, S47, T48, N56, N57, N66, S69, S70, N71, N74, S76, T86, N102, and S112 of Bos taurus α-lactalbumin, and has non-native glycosylation on one or more of such amino acid residues.

In some embodiments, the recombinant α-lactalbumin provided herein has an amino acid sequence that comprises one or more of amino acid residues selected from T4, Y18, S22, T29, T30, T33, S34, Y36, T38, S47, T48, Y50, S69, S70, S76, T86, Y103, and S112 of Bos taurus α-lactalbumin, and has non-native phosphorylation on one or more of such amino acid residues.

Recombinant κ-Casein Having Non Native PTM

In some embodiments, the recombinant milk protein provided herein is a recombinant κ-casein comprising a non-native PTM.

In some embodiments, the recombinant κ-casein provided herein has an amino acid sequence that comprises one or more of amino acid residues selected from S19, S33, S37, N41, N52, N53, S69, S80, N81, S87, T93, T94, S104, N113, T117, T121, N123, T124, S127, T131, S132, T133, T135, S141, T142, T145, S149, S155, N160, T161, T165, S166, and T167 of Bos taurus κ-casein, and has non-native glycosylation on one or more of such amino acid residues.

In some embodiments, the recombinant κ-casein provided herein has an amino acid sequence that comprises one or more of amino acid residues selected from S19, Y25, Y30, S33, Y35, S37, Y42, Y43, Y58, Y60, Y61, S69, S80, S87, T93, T94, S104, T117, T121, T124, S127, T131, S132, T133, T135, S141, T142, T145, S149, S155, T161, T165, S166, and T167 of Bos taurus κ-casein, and has non-native phosphorylation on one or more of such amino acid residues.

Dairy Substitute

In another aspect, provided herein is a dairy substitute that comprises a milk protein component, wherein the milk protein component comprises a recombinant milk protein having a non-native PTM as provided herein, and wherein the milk protein component imparts or materially contributes to a dairy attribute of the dairy substitute.

The term "milk protein component" as used herein refers to a component that consists of a subset of whey proteins or of a subset of caseins or of a mixture of a subset of whey proteins and a subset of caseins (i.e., consists of some but not all proteins present in, for example, whey protein concentrate, whey protein isolate, whey protein hydrolysate, casein isolate, casein concentrate, casein hydrolysate, milk protein isolate, milk protein concentrate, milk protein hydrolysate, micellar casein concentrate, sodium caseinate, or acid caseinate), wherein the subset of whey proteins or subset of caseins or mixture of subset of whey proteins and subset of caseins comprises a recombinant milk protein provided herein. The term implies that the milk proteins of which the milk protein component consists are the only milk proteins comprised in the dairy substitute provided herein (i.e., the dairy substitute comprises no milk proteins other than the milk proteins of which the milk protein component consists).

The dairy substitute provided herein is desirable as it provides advantages in production, including but not limited to: independence from the productivity of cattle; independence from market uncertainties due to outbreaks of disease among livestock; more limited negative impact on the environment (e.g., smaller natural resources requirements [e.g., less water, land, energy used], lower carbon dioxide production); no negative impact on animal welfare (e.g., no animal confinement, force feeding, or hormone treatment); mitigation of supply chain and production risk (e.g., use of recombinant proteins obtained providing supply chain variations and increased flexibility in production methods); and lower production costs.

The dairy substitute provided herein is further desirable as it provides advantages in composition and use, including but not limited to: being devoid of or having reduced levels of unhealthy components of mammal-derived milk (e.g., milk allergens, saturated fats, cholesterol, microbial contaminants [e.g., E. coli bacteria]); not comprising non-Kosher contaminants (e.g., blood); being suitable for halal diet; being suitable for vegan diet; having similar or superior nutrient content as milk (e.g., favorable amino acid profiles, low sugar); having superior taste/flavor and aroma than milk; potential for being specifically engineered to have desirable or novel attributes; having a dried form that can be stored at ambient conditions for an extended period of time (e.g., at least 1 year) without significant degradation or bacterial activity; having a readily reconstituted liquid or frozen form with extended shelf life; and/or providing functionality in replacing milk in a number of applications.

The dairy substitute according to any of the above can be essentially free of a protein obtained from plant (e.g., any of the plants disclosed herein), or comprise less than 0.5%, less than 1%, less than 5%, less than 10%, less than 15%, less than 20%, less than 30%, less than 40%, or less then 50% by dry mass of a protein obtained from plant.

The dairy substitute according to any of the above can comprise no other protein other than the milk protein comprised in the milk protein component.

The dairy substitute according to any of the above can be essentially free of one or more components obtained from an animal, such as, for example, mammal-derived milk, whey proteins extracted from mammal-derived milk, or caseins extracted from mammal-derived milk, or comprise 2% or less by mass of a component obtained from an animal.

The dairy substitute according to any of the above can be essentially free of a saturated lipid, or comprise less than 3%, less than 2%, less than 1%, less than 0.5%, or less than 0.1% by mass of a saturated lipid.

The dairy substitute according to any of the above can be essentially free of cholesterol, or comprise less than 1.5%, less than 1%, less than 0.5%, less than 0.1%, or less than 0.05% by mass of cholesterol.

The dairy substitute according to any of the above can be essentially free of lactose.

The dairy substitute according to any of the above can have an allergenicity that is lower than that of milk, such as, for example, an allergenicity of up to 0%, 1%, 5%, 10%, 15%, 20%, 25%, 30%, 35%, 40%, 45%, 50%, 55%, 60%, 65%, 70%, 75%, 80%, 85%, 90%, or 95% relative to that of milk. Allergenicity may be measured using a skin prick test, blood test, or oral food challenge.

At standard ambient temperature and conditions (i.e., 20-30° C. and 0.95-1.05 atm), the dairy substitute according to any of the above can be a fluid, semi-solid (e.g., gelatinous), solid, or powder. The dairy substitute can be used in powder form, or the powder form can be reconstituted with a hydrating agent prior to use, or the powder form can be mixed with other dry components (e.g., flour, sugar, minerals, pH or ionic strength adjusting agents) before a hydrating agent is added to the mixture. Non-limiting examples of suitable hydrating agents include water, milk (e.g., animal milk, nut milk, plant-based milk), juice (e.g., vegetable juice, fruit juice, other plant juice), brine (e.g., fluid or liquid used to soak beans or legumes), and mixtures thereof.

The dairy substitute according to any of the above can comprise a milk protein polymer network. The term "milk protein polymer network" as used herein refers to a network that is composed of repeated milk protein units that are linked to each other via covalent (e.g., disulfide bonds) or non-covalent (e.g., ionic) bonds, either directly with each other or via intermediary molecules.

Milk Protein Component

The dairy substitute according to any of the above can comprise between 0.1% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, or 0.2%; between 0.2% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, or 0.3%; between 0.3% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, or 0.4%; between 0.4% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, 0.6%, or 0.5%; between 0.5% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, 0.7%, or 0.6%; between 0.6% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, 0.8%, or 0.7%; between 0.7% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, 0.9%, or 0.8%; between 0.8% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, 1%, or 0.9%; between 0.9% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, 2%, or 1%; between 1% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, 3%, or 2%; between 2% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, 4%, or 3%; between 3% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, 5%, or 4%; between 4% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, 6%, or 5%; between 5% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, 7%, or 6%; between 6% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, 8%, or 7%; between 7% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, 9%, or 8%; between 8% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, 10%, or 9%; between 9% and 100%, 95%, 90%, 85%, 80%, 75%, 70%, 65%, 60%, 55%, 50%, 45%, 40%, 35%, 30%, 25%, 20%, 15%, 14%, 13%, 12%, 11%, or 10%; between 10% and 100%, 95%, 90%, 85%, 80%, 75%, 70%, 65%, 60%, 55%, 50%, 45%, 40%, 35%, 30%, 25%, 20%, 15%, 14%, 13%, 12%, or 11%; between 11% and 100%, 95%, 90%, 85%, 80%, 75%, 70%, 65%, 60%, 55%, 50%, 45%, 40%, 35%, 30%, 25%, 20%, 15%, 14%, 13%, or 12%; between 12% and 100%, 95%, 90%, 85%, 80%, 75%, 70%, 65%, 60%, 55%, 50%, 45%, 40%, 35%, 30%, 25%, 20%, 15%, 14%, or 13%; between 13% and 100%, 95%, 90%, 85%, 80%, 75%, 70%, 65%, 60%, 55%, 50%, 45%, 40%, 35%, 30%, 25%, 20%, 15%, or 14%; between 14% and 100%, 95%, 90%, 85%, 80%, 75%, 70%, 65%, 60%, 55%, 50%, 45%, 40%, 35%, 30%, 25%, 20%, or 15%; between 15% and 100%, 95%, 90%, 85%, 80%, 75%, 70%, 65%, 60%, 55%, 50%, 45%, 40%, 35%, 30%, 25%, or 20%; between 20% and 100%, 95%, 90%, 85%, 80%, 75%, 70%, 65%, 60%, 55%, 50%, 45%, 40%, 35%, 30%, or 25%; between 25% and 100%, 95%, 90%, 85%, 80%, 75%, 70%, 65%, 60%, 55%, 50%, 45%, 40%, 35%, or 30%; between 30% and 100%, 95%, 90%, 85%, 80%, 75%, 70%, 65%, 60%, 55%, 50%, 45%, 40%, or 35%; between 35% and 100%, 95%, 90%, 85%, 80%, 75%, 70%, 65%, 60%, 55%, 50%, 45%, or 40%; between 40% and 100%, 95%, 90%, 85%, 80%, 75%, 70%, 65%, 60%, 55%, 50%, or 45%; between 45% and 100%, 95%, 90%, 85%, 80%, 75%, 70%, 65%, 60%, 55%, or 50%; between 50% and 100%, 95%, 90%, 85%, 80%, 75%, 70%, 65%, 60%, or 55%; between 55% and 100%, 95%, 90%, 85%, 80%, 75%, 70%, 65%, or 60%; between 60% and 100%, 95%, 90%, 85%, 80%, 75%, 70%, or 65%; between 65% and 100%, 95%, 90%, 85%, 80%, 75%, or 70%; between 70% and 100%, 95%, 90%, 85%, 80%, or 75%; between 75% and 100%, 95%, 90%, 85%, or 80%; between 80% and 100%, 95%, 90%, or 85%; or between 85% and 100%, 95%, 90%; between 90% and 100% or 95%, or between 95% and 100% by mass of the milk protein component comprising a recombinant milk protein having one or more non-native PTMs as provided herein.

The recombinant milk protein having one or more non-native PTMs comprised in the milk protein component comprises a single recombinant milk protein having one or more non-native PTMs as provided herein (e.g., a recombinant β-lactoglobulin having one or more non-native PTMs as provided herein, a recombinant α-lactalbumin having one or more non-native PTMs as provided herein, a recombinant κ-casein having one or more non-native PTMs as provided herein), or two or more recombinant milk proteins having one or more non-native PTMs as provided herein (e.g., a mixture of a recombinant β-lactoglobulin having different one or more non-native PTMs as provided herein, a mixture of a recombinant α-lactalbumin having different one or more non-native PTMs as provided herein, a mixture of a recombinant κ-caseins having different one or more non-native PTMs as provided herein, a mixture of a recombinant β-lactoglobulin having one or more non-native PTMs as provided herein and a recombinant α-lactalbumin having one or more non-native PTMs as provided herein, a mixture of a recombinant κ-caseins having one or more non-native PTMs as provided herein and a recombinant β-lactoglobulin having one or more non-native PTMs as provided herein, a mixture of a recombinant κ-caseins having one or more non-native PTMs as provided herein and a recombinant α-lactalbumin having one or more non-native PTMs as provided herein, a mixture of a recombinant β-lactoglobulin having one or more non-native PTMs as provided herein and a recombinant α-lactalbumin having one or more non-native PTMs as provided herein and a recombinant κ-caseins having one or more non-native PTMs as provided herein).

The milk protein component can further comprise another milk protein. The optional other milk protein can be a native milk protein or a recombinant milk protein not provided herein. In embodiments in which the optional other milk protein is a native milk protein, the native milk protein can be obtained from any mammalian species, including but not limited to cow, human, sheep, goat, water buffalo, camel, horse, donkey, lemur, panda, guinea pig, squirrel, bear, macaque, gorilla, chimpanzee, mountain goat, monkey, ape, cat, dog, wallaby, rat, mouse, elephant, opossum, rabbit, whale, baboons, gibbons, orangutan, mandrill, pig, wolf, fox, lion, tiger, reindeer, and echidna.

The milk protein component according to any of the above must consist of: a recombinant β-lactoglobulin having one or more non-native PTMs as provided herein; a recombinant α-lactalbumin having one or more non-native PTMs as provided herein; a recombinant κ-casein having one or more non-native PTMs as provided herein; a mixture of two or more recombinant β-lactoglobulins having different one or more non-native PTMs as provided herein (i.e., a mixture of two or more recombinant β-lactoglobulins having one or more different non-native PTMs); a mixture of two or more recombinant α-lactalbumins having different one or more non-native PTMs as provided herein (i.e., a mixture of two or more recombinant α-lactalbumins having one or more different non-native PTMs); a mixture of one or more recombinant κ-caseins having different one or more non-native PTMs as provided herein (i.e., a mixture of two or more recombinant κ-caseins having one or more different non-native PTMs); a recombinant β-lactoglobulin having one or more non-native PTMs as provided herein combined with any one or more or all of an α-lactalbumin (e.g., a native α-lactalbumin, a recombinant α-lactalbumin not provided herein, a recombinant α-lactalbumin having one or more non-native PTMs as provided herein), a lactoferrin (e.g., a native lactoferrin, a recombinant lactoferrin), a transferrin (e.g., a native transferrin, a recombinant transferrin), a serum albumin (e.g., a native serum albumin, a recombinant serum albumin), a lactoperoxidase (e.g., a native lactoperoxidase, a recombinant lactoperoxidase), a GMP (e.g., a native GMP, a recombinant GMP), a β-casein (e.g., a native β-casein, a recombinant β-casein), a γ-casein (e.g., a native γ-casein, a recombinant γ-casein), a κ-casein (e.g., a native κ-casein, a recombinant κ-casein not provided herein, a recombinant κ-casein having one or more non-native PTMs as provided herein), an α-S1-casein (e.g., a native α-S1-casein, a recombinant α-S1-casein), and an α-S2-casein (e.g., a native α-S2-casein, a recombinant α-S2-casein); a recombinant α-lactalbumin having one or more non-native PTMs as provided herein combined with any one or more or all of a β-lactoglobulin (e.g., a native β-lactoglobulin, a recombinant β-lactoglobulin not provided herein, a recombinant β-lactoglobulin having one or more non-native PTMs as provided herein), a lactoferrin (e.g., a native lactoferrin, a recombinant lactoferrin), a transferrin (e.g., a native transferrin, a recombinant transferrin), a serum albumin (e.g., a native serum albumin, a recombinant serum albumin), a lactoperoxidase (e.g., a native lactoperoxidase, a recombinant lactoperoxidase), a GMP (e.g., a native GMP, a recombinant GMP), a β-casein (e.g., a native β-casein, a recombinant β-casein), a γ-casein (e.g., a native γ-casein, a recombinant γ-casein), a κ-casein (e.g., a native κ-casein, a recombinant κ-casein not provided herein, a recombinant κ-casein having one or more non-native PTMs as provided herein), an α-S1-casein (e.g., a native α-S1-casein, a recombinant α-S1-casein), and an α-S2-casein (e.g., a native α-S2-casein, a recombinant α-S2-casein); or a recombinant κ-casein having one or more non-native PTMs as provided herein combined with any one or more or all of a β-lactoglobulin (e.g., a native β-lactoglobulin, a recombinant β-lactoglobulin not provided herein, a recombinant β-lactoglobulin having one or more non-native PTMs as provided herein), a lactoferrin (e.g., a native lactoferrin, a recombinant lactoferrin), a transferrin (e.g., a native transferrin, a recombinant transferrin), a serum albumin (e.g., a native serum albumin, a recombinant serum albumin), a lactoperoxidase (e.g., a native lactoperoxidase, a recombinant lactoperoxidase), a GMP (e.g., a native GMP, a recombinant GMP), a β-casein (e.g., a native β-casein, a recombinant β-casein), a γ-casein (e.g., a native γ-casein, a recombinant γ-casein), a α-lactalbumin (e.g., a native α-lactalbumin, a recombinant α-lactalbumin not provided herein, a recombinant α-lactalbumin having one or more non-native PTMs as provided herein), an α-S1-casein (e.g., a native α-S1-casein, a recombinant α-S1-casein), and an α-S2-casein (e.g., a native α-S2-casein, a recombinant α-S2-casein).

The milk protein component according to any of the above can comprise or consist of recombinant milk proteins having one or more non-native PTMs as provided herein and native milk proteins at a mass ratio of between about 100 to 1 and about 1 to 100 (e.g., about 100 to 1, about 90 to 1, about 80 to 1, about 70 to 1, about 60 to 1, about 50 to 1, about 40 to 1, about 30 to 1, about 20 to 1, about 10 to 1, about 9 to 1, about 8 to 1, about 7 to 1, about 6 to 1, about 5 to 1, about 4 to 1, about 3 to 1, about 2 to 1, about 1 to 1, about 1 to 2, about 1 to 3, about 1 to 4, about 1 to 5, about 1 to 6, about 1 to 7, about 1 to 8, about 1 to 9, about 1 to 10, about 1 to 20, about 1 to 30, about 1 to 40, about 1 to 50, about 1 to 60, about 1 to 70, about 1 to 80, about 1 to 90, or about 1 to 100).

The milk protein component according to any of the above can comprise or consist of recombinant β-lactoglobulin having one or more non-native PTMs as provided herein and/or α-lactalbumin having one or more non-native PTMs as provided herein and native whey protein at a mass ratio of between about 10 to 1 and about 1 to 10 (e.g., about 10 to 1, about 9 to 1, about 8 to 1, about 7 to 1, about 6 to 1, about 5 to 1, about 4 to 1, about 3 to 1, about 2 to 1, about 1 to 1, about 1 to 2, about 1 to 3, about 1 to 4, about 1 to 5, about 1 to 6, about 1 to 7, about 1 to 8, about 1 to 9, about 1 to 10).

The milk protein component according to any of the above can comprise or consist of recombinant κ-casein having one or more non-native PTMs as provided herein and native casein at a mass ratio of between about 10 to 1 and about 1 to 10 (e.g., about 10 to 1, about 9 to 1, about 8 to 1, about 7 to 1, about 6 to 1, about 5 to 1, about 4 to 1, about 3 to 1, about 2 to 1, about 1 to 1, about 1 to 2, about 1 to 3, about 1 to 4, about 1 to 5, about 1 to 6, about 1 to 7, about 1 to 8, about 1 to 9, about 1 to 10).

The milk protein component of the dairy substitute according to any of the above can comprise a recombinant milk protein having one or more non-native PTMs as provided herein that lacks an allergenic epitope (i.e., an amino acid sequence that can elicit an immune response in a human or animal).

The milk protein component of the dairy substitute according to any of the above can comprise a recombinant milk protein having one or more non-native PTMs as provided herein that comprises a reactive site. The term "reactive site" as used herein refers to a chemical group on a molecule (e.g., polypeptide) that can form a covalent bond (i.e., "crosslink") with a chemical group on another molecule (e.g., another polypeptide). The reactive site can be a native reactive site, a non-native reactive site (i.e., a reactive site that is not present in the native milk protein), or a mixture of at least one native reactive site and at least one non-native reactive site. Non-limiting examples of suitable reactive sites include disulfides, thiols, primary amines, carboxyls, carboxamides, and hydroxyls (see, for example, (Means & Feeney. 1971. Chemical Modification of Proteins. Holden Day, Inc. San Francisco, Cambridge, London, Amsterdam). Methods for introducing or removing reactive sites in polypeptides are known in the art (see, for example, Means, GA & Feeney, R E. 1971. Chemical Modification of Proteins. Holden Day, Inc. San Francisco, Cambridge, London, Amsterdam), and include, for example, deleting or inserting amino acid residues comprising reactive sites (e.g., cysteine residues, lysine residues, glutamic acid residues, aspartic acid residues, non-natural amino acids (e.g., selenocysteine, methylated amino acids, argenylated amino acids, acylated amino acids, biotinylated amino acids)). The type and/or number and/or location of a reactive site in a recombinant milk protein can confer or materially impact a dairy attribute in the dairy substitute according to any of the above. It is also within the scope of the invention that a recombinant milk protein comprised in the milk protein component of the dairy substitute according to any of the above lacks a reactive site that is present in the corresponding native milk protein.

The milk protein component of the dairy substitute according to any of the above can comprise a recombinant milk protein having one or more non-native PTMs as provided herein that comprises a milk protein repeat. The term "milk protein repeat" as used herein refers to an amino acid sequence that is at least 80% identical (e.g., at least 80%, at least 85%, at least 90%, at least 95% identical, at least 99% identical) to an amino acid sequence in a protein found in a mammal-produced milk (e.g., a whey protein, a casein) and that is present more than once (e.g., at least 2, at least 3, at least 4, at least 5, at least 10, at least 15, at least 20, at least 30, at least 40, at least 50, at least 75, at least 100, at least 150, or at least 200 times) in the recombinant milk protein. A milk protein repeat may comprise at least 10, at least 20, at least 30, at least 40, at least 50, at least 75, at least 100, at least 150, and usually not more than 200 amino acids. A milk protein repeat in a recombinant milk protein can be consecutive (i.e., have no intervening amino acid sequences) or non-consecutive (i.e., have intervening amino acid sequences). When present non-consecutively, the intervening amino acid sequence may play a passive role in providing molecular weight without introducing an undesirable property, or may play an active role in providing for a particular property (e.g., solubility, biodegradability, binding to other molecules). The type and/or number and/or location of a milk protein repeat in a recombinant milk protein can confer or materially impact a dairy attribute in the dairy substitute according to any of the above.

Other Ingredients

The dairy substitute according to any of the above can further comprise an other ingredient (e.g., any of the other ingredients disclosed herein), for example at between 0.001% and 50%, 25%, 20%, 15%, 10%, 9%, 8%, 7%, 6%, 5%, 4%, 3%, 2%, 1%, 0.5%, 0.1%, or 0.01%; between 0.01% and 50%, 25%, 20%, 15%, 10%, 9%, 8%, 7%, 6%, 5%, 4%, 3%, 2%, 1%, 0.5%, or 0.1%; between 0.1% and 50%, 25%, 20%, 15%, 10%, 9%, 8%, 7%, 6%, 5%, 4%, 3%, 2%, 1%, or 0.5%; between 0.5% and 50%, 25%, 20%, 15%, 10%, 9%, 8%, 7%, 6%, 5%, 4%, 3%, 2%, or 1%; between 1% and 50%, 25%, 20%, 15%, 10%, 9%, 8%, 7%, 6%, 5%, 4%, 3%, or 2%; between 2% and 50%, 25%, 20%, 15%, 10%, 9%, 8%, 7%, 6%, 5%, 4%, or 3%; between 3% and 50%, 25%, 20%, 15%, 10%, 9%, 8%, 7%, 6%, 5%, or 4%; between 4% and 50%, 25%, 20%, 15%, 10%, 9%, 8%, 7%, 6%, or 5%; between 5% and 50%, 25%, 20%, 15%, 10%, 9%, 8%, 7%, or 6%; between 6% and 50%, 25%, 20%, 15%, 10%, 9%, 8%, or 7%; between 7% and 50%, 25%, 20%, 15%, 10%, 9%, or 8%; between 8% and 50%, 25%, 20%, 15%, 10%, 9%; between 9% and 50%, 25%, 20%, 15%, or 10%; between 10% and 50%, 25%, 20%, or 15%; between 15% and 50%, 25%, or 20%; between 20% and 50% or 25%; or between 25% and 50% by mass of any one such other ingredient, any combination of two or more such other ingredients, or all such other ingredients.

The dairy substitute according to any of the above can comprise a nutritional agent (such as for example, a nutraceutical, nutritional supplement, prebiotic, probiotic, provitamin, vitamin (e.g., vitamin A, vitamin B, vitamin E, vitamin D, vitamin K), mineral (e.g., calcium, phosphorous, potassium, sodium, citrate, chloride, phosphate, sulfate, magnesium, potassium, zinc, iron, molybdenum, manganese, copper), antioxidant, lipid, or non-milk protein) or a functional agent (such as, for example, an acidulant, buffering agent, shelf life extending agent, pH and/or ionic strength adjusting agent, anti-microbial agent, anti-oxidant, preservative, emulsifier, texturing/mouthfeel agent, coloring agent, taste/flavor agent, aroma agent, leavening agent, flow agent, bakery conditioners, or sweetening agent).

The dairy substitute according to any of the above can comprise a lipid, such as, for example, a fat, oil, monoglyceride, diglyceride, triglyceride, phospholipid, free fatty acid, or mixture thereof.

The dairy substitute according to any of the above can comprise an oil, such as, for example, a plant oil (e.g., sunflower oil, coconut oil, mustard oil, peanut oil, canola oil, corn oil, cottonseed oil, flax seed oil, olive oil, palm oil, rapeseed oil, safflower oil, sesame oil, soybean oil, almond oil, beech nut oil, brazil nut oil, cashew oil, hazelnut oil, macadamia nut oil, mongongo nut oil, pecan oil, pine nut oil, pistachio nut oil, walnut oil, avocado oil, grape oil), microbe-derived oil, algae-derived oil, fungus-derived oil, marine animal oil (e.g., Atlantic fish oil, Pacific fish oil, Mediterranean fish oil, light pressed fish oil, alkaline treated fish oil, heat treated fish oil, light and heavy brown fish oil, bonito oil, pilchard oil, tuna oil, sea bass oil, halibut oil, spearfish oil, barracuda oil, cod oil, menhaden oil, sardine oil, anchovy oil, capelin oil, Atlantic cod oil, Atlantic herring oil, Atlantic mackerel oil, Atlantic menhaden oil, salmonid oil, shark oil, squid oil, cuttle fish oil, octopus oil, krill oil, seal oil, whale oil), non-essential oil, essential oil, natural oil, non-hydrogenated oil, partially hydrogenated oil, hydrogenated oil (e.g., hydrogenated coconut oil), crude oil, semi-refined (also called alkaline refined) oil, interesterified oil, refined oil, or derivative or mixture thereof.

The dairy substitute according to any of the above can comprise a monoglyceride or diglyceride, such as, for example, a plant-derived monoglyceride or diglyceride (e.g., monoglyceride or diglyceride derived from sunflower, coconut, peanut, cottonseed, olive, palm, rapeseed, safflower, sesame seed, soybean, almond, beech nut, Brazil nut, cashew, hazelnut, macadamia nut, mongongo nut, pecan, pine nut, pistachio, walnut, and avocado), or monoglyceride or diglyceride comprising an acyl chain of any of the free fatty acids disclosed herein, or any mixture of two or more thereof.

The dairy substitute according to any of the above can comprise a free fatty acid, such as, for example, a butyric acid; caproic acid; caprylic acid; capric acid; lauric acid; myristic acid; palmitic acid; stearic acid; arachidic acid; behenic acid; lignoceric acid; cerotic acid; myristoleic acid; palmitoleic acid; sapienic acid; oleic acid; elaidic acid; vaccenic acid; linoleic acid; linoelaidic acid; α-linolenic acid; arachidonic acid; eicosapentaenoic acid; erucic acid; docosahexaenoic acid; omega-fatty acid (e.g., arachidonic acid, omega-3-fatty acid, omega-6-fatty acid, omega-7-fatty acid, omega-9-fatty acid); fatty acid with even number of carbons of 4-16 carbons in length; monosaturated acid [particularly with 18 carbons]; fatty acid with low interfacial tension (e.g., less than 20, less than 15, less than 11, less than 9, less than 7, less than 5, less than 3, less than 2, less than 1, or less than 0.5 dynes/cm, from 0.1 to 20, from 1 to 15, from 2 to 9, from 3 to 9, from 4 to 9, from 5 to 9, from 2 to 7, from 0.1 to 5, from 0.3 to 2, or from 0.5 to 1 dynes/cm, 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0); butyric (4:0) acid or caproic (6:0) acid that is esterified at sn-3; medium-chain fatty acid (8:0-14:0) as well as 16:0 that are esterified at positions sn-1 and sn-2; fatty acid in which stearic acid (18:0) is placed at position sn-1; fatty acid in which oleic acid (18:1) is placed at positions sn-1 and sn-3; fatty acid that have a range of carbon atoms (e.g., from 8 to 40, from 10 to 38, from 12 to 36, from 14 to 34, from 16 to 32, from 18 to 30, or from 20 to 28 carbon atoms); fatty acid that comprise at least one unsaturated bond (i.e., carbon-carbon double or triple bond; e.g., at least 2, at least 3, at least 4, at least 5, at least 6, at least 7, or at least 8 carbon-carbon double bonds and/or triple bonds); fatty acid with conjugated unsaturated bond (i.e., at least one pair of carbon-carbon double and/or triple bonds are bonded together, without a methylene (CH2) group between them [e.g., 4CH:CHi CH:CHi]); or derivative (e.g., ester [e.g., methyl and ethyl ester], salt [e.g., sodium and potassium salt], triglyceride derivative, diglycerides derivative, monoglyceride derivative) thereof; or any mixture of two or more thereof.

The dairy substitute according to any of the above can comprise a phospholipid, such as, for example, a lecithin phospholipid (e.g., soy lecithin phospholipid, sunflower lecithin phospholipid, cotton lecithin phospholipid, rapeseed lecithin phospholipid, rice bran lecithin phospholipid, corn lecithin phospholipid, flour lecithin phospholipid), cardiolipin, ceramide phosphocholine, ceramide phosphoethanolamine, glycerophospholipid, phosphatidic acid, phosphatidylcholine, phosphatidylethanolamine, phosphatidylinositol, phosphosphingolipid, phosphatidylserine, or derivative thereof, or any mixture of two or more thereof.

The dairy substitute according to any of the above can comprise a triglyceride, such as, for a tributyrin; short-chain triglyceride; short-chain triglyceride comprising three oleic acid; short-chain triglyceride comprising hexanoic acid; short-chain triglyceride comprising hexanoic acid and butyric acid; short-chain triglyceride comprising hexanoic acid and decanoic acid; and short-chain triglyceride comprising one butyric, one hexanoic, and one octanoic acid; or derivative thereof, or any mixture of two or more thereof.

The dairy substitute according to any of the above can further comprise a carbohydrate.

The carbohydrate can be obtained from any source, including, for example, a plant (e.g., any of the plants disclosed herein), an algae (e.g., any of the algae disclosed herein), a fungus (e.g., any of the fungi disclosed herein), or a bacterium (e.g., any of the bacteria disclosed herein).

Nonlimiting examples of suitable carbohydrates include: monosaccharides, such as, for example, glucose, fructose, galactose, and mixtures thereof; disaccharides, such as, for example, maltose, lactose, sucrose, and mixtures thereof; polysaccharides, such as for example, starches (e.g., pectin, corn (maize) starch, oat starch, potato starch, sweet potato starch, rice starch, pea starch, wheat starch, azuki starch, green bean starch, kudzu starch, Katakuri starch, arrowroot starch, mung bean starch, sago starch, tapioca starch, plant starch (e.g., starch obtained from any of the plants disclosed herein), and derivatives thereof, and mixtures of two or more thereof. In some embodiments, the starch is a modified starch (e.g., pregelatinized starch (e.g., corn, wheat, tapioca), pregelatinized high amylose content starch, pregelatinized hydrolyzed starches (e.g., maltodextrins, corn syrup solids, rice syrup solids, tapioca syrup solids), chemically modified starches such as pregelatinized substituted starches (e.g., octenyl succinate modified starches), alkaline modified starch, bleached starch, oxidized starch, monostarch phosphate, distarch phosphate, phosphated distarch phosphate, acetylated distarch phosphate, acetylated starch, mono starch acetate, acetylated starch, mono starch acetate, acetylated distarch adipate, distarch glycerine, hydroxy propyl starch, hydroxy propyl distarch glycerine, hydroxy propyl distarch phosphate, starch sodium octenyl succinate, acetylated oxidized starch, dextrin, sodium octenylsuccinate starch, and derivatives thereof, and mixtures of two or more thereof), flours (e.g., acorn flour, almond flour, amaranth flour, *atta* flour, barley flour, bean flour, buckwheat flour, cassava flour, chestnut flour, churio flour, coconut flour, corn (maize) flour, durum flour, einkorn flour, emmer flour, fava bean flour, garbanzo flour, ground chia seeds, ground flaxseeds, hemp flour, khorasan flour, lentil flour, maida flour, malted barley flour, masa harina, mesquite flour, millet flour, nut flour, oat flour, pea flour, peanut flour, potato flour, *quinoa* flour, rice flour, rye flour, sorghum flour, soy flour, spelt flour, sweet rice flour, taro flour, teff flour, wheat flour, vital wheat gluten, ground chia seeds, ground flaxseed, and derivatives thereof, and mixtures of two or more thereof), gums (e.g., arrowroot flour, xanthan gum, acacia gum (gum arabic), gellan gum, guar gum, locust bean gum (carob gum), tragacanth gum, carrageenan, tara gum, wheat gum, konjac gum, agar gum, karaya gum, salep, modified cellulose (e.g., methylcellulose, methoxymethylcellulose, hydroxypropyl methylcellulose, carboxymethylcellulose, microcrystalline cellulose), and derivatives and mixtures thereof. In some embodiments, the gum is a modified gum (e.g., deacetylated, deacetylated clarified, partially deacetylated, partially deacetylated clarified, and derivatives thereof, and mixtures of two or more thereof)), edible fibers (e.g., acacia fiber, bamboo fiber, barley bran, carrot fiber, cellulose (e.g., wood pulp cellulose), citrus fiber, corn bran, soluble dietary fiber, insoluble dietary fiber, oat bran, pea fiber, rice bran, *psyllium* husk, konjac, soy fiber, soy polysaccharide, wheat bran, inulin, and derivatives thereof, and mixtures of two or more thereof), and mixtures of two or more thereof; and mixtures of two or more thereof.

The dairy substitute according to any of the above can comprise a non-milk protein (including a recombinant non-milk protein having a native PTM, a non-native PTM, or a mixture thereof, and/or lacking a native PTM, and/or lacking an epitope that can elicit an immune response in a human or animal) obtained from an animal (such as, for example, an insect (e.g., fly), mammal (e.g. cow, sheep, goat, rabbit, pig, human), or bird (e.g., chicken)) or plant (such as, for example, pea, potato, *faba* bean, soybean, and canola) or microbe (i.e., unicellular organism, such as, for example, yeast, bacteria, archaea, unicellular protista, unicellular animals, unicellular plants, unicellular fungi, unicellular algae, protozoa, or chromista). Non-limiting examples of non-milk proteins include serum proteins (e.g., albumin), egg proteins (e.g., ovomucoid, ovalbumin, ovotransferrin, G162M F167A ovomucoid, ovoglobulin G2, ovoglobulin G3, α-ovomucin, β-ovomucin, lysozyme, ovoinhibitor, ovoglycoprotein, flavoprotein, ovomacroglobulin, ovostatin, cystatin, avidin, ovalbumin related protein X, and ovalbumin related protein Y), structural proteins (e.g., collagen, tropoelastin, elastin), and plant proteins (e.g., protein concentrates or protein isolates obtained from pea, potato, *faba* bean, soybean, or canola).

The dairy substitute according to any of the above can comprise an anti-oxidant, such as, for example, α-tocopherol (e.g., tocopherol comprised in bovine milk), low molecular weight thiol (e.g., low molecular weight thiol comprised in bovine milk), retinol (e.g., retinol comprised in bovine milk), carotenoid (e.g., carotenoid comprised in cow milk, α-carotene, β-carotene, γ-carotene, lutein, zeaxanthin, astaxanthin), vitamin E, Azadirachta indica extract, riboflavin, rosemary extract, phenolic diterpene (e.g., carnosol, carnosic acid) comprised in rosemary extract, sage extract, ascorbic acid (vitamin C) and its salts, lactic acid and its salts, grape residue silage, phenolic compound (e.g., ferulic acid) comprised in grape residue silage, soybean (*Glycine max*) extract, isoflavone or polyphenolic compound comprised in soybean extract, garlic (*Allium sativum*) extract, phenolic or flavonoid, or terpenoid compound comprised in garlic extract, fennel (*Foeniculum vulgare* Mill.) extract, chamomile (*Matricaria recutita* L.) extract, fatty acid (e.g., alpha-lipoic acid), brown algae (e.g., *Ascophyllum nodosum*, *Fucus vesiculosus*), essential oil of green pink pepper (GEO), essential oil of mature pink pepper (MEO), green tea extract, butylated hydroxyanisole (E320), butylated hydroxytoluene (E321), polyphenol (e.g., curcumin, curcuminoid, desmethoxycurcumin (hydroxycirmamoyl feruloylmethane), bis-desmethoxycurcumin), catechin (e.g., epigallocatechin gallate, epicatechin gallate, epigallocatechin, epicatechin, C catechin, catechin comprised in green tea extract), or derivative thereof, or any mixture of two or more thereof.

The dairy substitute according to any of the above can comprise a emulsifier, such as, for example, an anionic emulsifier, non-ionic emulsifier, cationic emulsifier, amphoteric emulsifier, bioemulsifier, steric emulsifier, Pickering emulsifier, glycolipids (e.g., trehalose lipid, sophorolipid, rhamnolipid, mannosylerythriol lipids), oligopeptides (e.g., gramicidin S, polymyxin), lipopeptides (e.g., surfactin), phospholipid, fatty acid, neutral lipid, polymeric biosurfactant, amphipathic polysaccharide, lipopolysaccharide, proteins (e.g., pea protein, soy protein, chickpea protein, algae protein, yeast protein, potato protein, lentil protein), mannoprotein, sodium phosphate, calcium stearoyl lactylate, mono- and diacetyl tartaric acid esters of monoglyceride, phospholipid, sorbitan monostearate, magnesium stearate, sodium/potassium/calcium salts of fatty acid, calcium stearoyl di lactate, poly-glycerol ester, sorbitan fatty acid ester, acetic acid esters of monoglyceride, lactic acid esters of monoglyceride, citric acid esters of monoglyceride, polyglycerol esters of fatty acid, polyglycerol polyricinoleate, propane-1,2-diol esters of fatty acid, sugar ester, sucrose esters of fatty acid, monoglyceride, acetylated monoglyceride, lactylated monoglyceride, diglyceride, phosphate monoglyceride, diacetyl tartaric acid ester, sodium/calcium stearoyl-2-lactylate, ammonium phosphatide, polysorbate, polysorbate-80, carboxymethylcellulose (CMC), modulated cellulose, citric acid ester, liposan, emulsan, lecithins (e.g., plant-based lecithin, garbanzo lecithin, fava bean lecithin, soy lecithin, sunflower lecithin, canola lecithin), surfactants (e.g., sorbitan trioleate (Span 85), sorbitan tristearate (Span 65), sorbitan sesquioleate (Arlacel 83), glyceryl monostearate, sorbitan monooleate (Span 80), sorbitan monostearate (Span 60), sorbitan monopalmitate (Span 40), sorbitan monolaurate (Span 20), polyoxyethylene sorbitan tristearate (Tween 65), polyoxyethylene sorbitan trioleate (Tween 85), polyethylene glycol 400 monostearate, polysorbate 60 (Tween 60), polyoxyethylene monostearate, polysorbate 80 (Tween 80), polysorbate 40 (Tween 40), polysorbate 20 (Tween 20), PEG 20 tristearate, PEG 20 trioleate, PEG 20 monostearate, PEG 20 monooleate, PEG 20 monopalmitate, and PEG 20 monolaurate sorbitan), and derivatives and mixtures thereof.

The dairy substitute according to any of the above can comprise a sweetening agent, such as, for example, *stevia*, aspartame, cyclamate, saccharin, sucralose, mogrosides, brazzein, curculin, erythritol, glycyrrhizin, inulin, isomalt, lacititol, mabinlin, malititol, mannitol, miraculin, monatin, monelin, osladin, pentadin, sorbitol, thaumatin, xylitol, acesulfame potassium, advantame, alitame, aspartame-acesulfame, sodium cyclamate, dulcin, glucin, neohesperidin dihyrdochalcone, neotame, P-4000, honey, sucrose, corn syrup solids, glucose, lactose, galactose, dextrose, fructose, maltose, isomaltulose, trehalose, maltodextrin, asulfame K, cyclamates, L-aspartyl-L-phenylalanine, tagatose, stevioside, hydrogenated starch hydrolysates, high-fructose corn syrup, fructooligosaccharides, polydextrose, or a derivative or mixture thereof.

Composition Comprising Recombinant Milk Protein Having Non-Native PTMs

In another aspect, provided herein is a composition that comprises the dairy substitute according to any of the above, wherein the dairy substitute imparts or materially contributes to a dairy attribute of the composition.

The composition according to any of the above can comprise at least 0.001%, 0.01%, 0.1%, 1%, 10%, 20%, 30%, 40%, 50%, 60%, 70%, 80%, 90%, 95%, or 99%; between 0.001% and 100%, 99%, 95%, 90%, 80%, 70%, 60%, 50%, 40%, 30%, 20%, 10%, 1%, 0.1%, or 0.01%; between 0.01% and 100%, 99%, 95%, 90%, 80%, 70%, 60%, 50%, 40%, 30%, 20%, 10%, 1%, or 0.1%; between 0.1% and 100%, 99%, 95%, 90%, 80%, 70%, 60%, 50%, 40%, 30%, 20%, 10%, or 1%; between 1% and 100%, 99%, 95%, 90%, 80%, 70%, 60%, 50%, 40%, 30%, 20%, or 10%; between 10% and 100%, 99%, 95%, 90%, 80%, 70%, 60%, 50%, 40%, 30%, or 20%; between 20% and 100%, 99%, 95%, 90%, 80%, 70%, 60%, 50%, 40%, or 30%; between 30% and 100%, 99%, 95%, 90%, 80%, 70%, 60%, 50%, or 40%; between 40% and 100%, 99%, 95%, 90%, 80%, 70%, 60%, or 50%; between 50% and 100%, 99%, 95%, 90%, 80%, 70%, or 60%; between 60% and 100%, 99%, 95%, 90%, 80%, or 70%; between 70% and 100%, 99%, 95%, 90%, or 80%; between 80% and 100%, 99%, 95%, or 90%; between 90% and 100%, 99%, or 95%; between 95% and 100% or 99%; or between 99% and 100% by mass of the dairy substitute.

The composition according to any of the above can be essentially free of a component obtained from an animal (e.g., any or all components obtained from an animal disclosed herein), or comprise 2% or less by mass of a component obtained from an animal.

The composition according to any of the above can have an allergenicity that is lower than that of a comparable composition, such as, for example, an allergenicity of up to 0%, 1%, 5%, 10%, 15%, 20%, 25%, 30%, 35%, 40%, 45%, 50%, 55%, 60%, 65%, 70%, 75%, 80%, 85%, 90%, or 95% relative to that of a comparable composition.

The composition according to any of the above can comprise a milk protein polymer network.

The composition according to any of the above can be a variety of products, including, for example, a food product (i.e., product that is ingested for dietary purposes), polymer, pharmaceutical product, or personal care product.

Food Product

In another aspect, provided herein is a food product that comprises the dairy substitute according to any of the above, wherein the dairy substitute imparts or materially contributes to a dairy attribute of the food product.

Food products comprising β-lactoglobulin and/or α-lactalbumin are desirable, particularly for athletes, as these milk proteins have high contents of essential and branched-chain amino acids, which are thought to aide production of muscle tissue. Moreover, β-lactoglobulin is desirable as a food additive as it has good water binding ability, which property makes β-lactoglobulin suitable for managing water activity of food products (see, for example, Gustavo et al. 2007. Water Activity in Foods: Fundamentals and Applications, Wiley-Blackwell, ISBN: 978-0-8138-2408-6). Moreover, β-lactoglobulin is desirable as a food additive as it has anti-microbial activity, which property makes β-lactoglobulin suitable for extending the shelf life of food products. Moreover, β-lactoglobulin is desirable as a food additive as it can readily absorb at interfaces, which property makes β-lactoglobulin suitable for producing highly stable dispersions in food products. Moreover, α-lactalbumin is rich in the amino acid cysteine, which is a building block of glutathione, a powerful antioxidant in the body that plays an important role in immunity, and the neurotransmitter serotonin and the neurosecretory hormone melatonin, which play a role in regulating neurobehavioral effects such as appetite, sleeping-waking rhythm, pain perception, mood, anxiety and stress control. Food products comprising κ-casein are desirable as κ-casein helps solubilize insoluble organic and inorganic molecules (e.g., calcium ions) as well as insoluble proteins, improves mouthfeel of certain food products, and can form gels and curds for making yoghurt and other products. Moveover, κ-casein comprises sites for enzyme rennet activity, which is key to making cheese. Moreover, food products comprising non-allergenic milk proteins are desirable as they can be consumed by an increasing number of people who are allergic against dairy products.

The food product according to any of the above can be or resemble a food product (i.e., can be a "substitute food product") selected from any of the food product categories defined by the National Health and Nutrition Examination Survey (NHANES), including, for example, snack foods and gums (e.g., snack bars, crackers, salty snacks from grain products, chewing gums); breads, grains, and pastas (e.g., oat breads and rolls, cornbread, corn muffins, tortillas, flour and dry mixes, biscuits, multi-grain breads and rolls, whole wheat breads and rolls, pastas, rye breads and rolls, cracked wheat breads and rolls, white breads and rolls); beverages (e.g., beers and ales, beverage concentrates, beverages, energy drinks, sports drinks, fluid replacements, soft drinks, carbonated beverages, juices, wines, cocktails, nutrition drinks, nutrition powders, protein-enriched beverages); sweets and desserts (e.g., cakes, candies, chips, cookies, cobblers, pastries, ices or popsicles, muffins, pies, sugar replacements or substitutes, syrups, honey, jellies, jams, preserves, salads, crepes, Danish, breakfast pastries, doughnuts); breakfast foods (e.g., cereal grains, cereal, rice, French toast, pancakes, waffles, coffee cake); eggs (e.g., whole egg (e.g., liquid whole egg, spray-dried whole egg, frozen whole egg), egg white (e.g., liquid egg white, spray-dried egg white, frozen egg white), egg dishes, egg soups, mixtures made with egg whites, egg substitutes, mixtures made with egg substitutes); salad dressings, oils, sauces, condiments (e.g., cooking fats, vegetable oils, salad dressings, tomato sauces, gravies); potatoes (e.g., potato salad, potato soups, chips and sticks, fried potatoes, mashed potatoes, stuffed potatoes, puffs); and soups (e.g., vegetable soups, vegetable broths), meals, main dishes, proteins (e.g., meat substitutes), and seafoods.

The food product according to any of the above can be or resemble a dairy product (i.e., can be a "substitute dairy product").

The food product according to any of the above can comprise no additional milk protein other than the milk protein comprised in the milk protein component comprised in the dairy substitute.

The food product according to any of the above can be essentially free of a saturated lipid, or comprise less than 3%, less than 2%, less than 1%, less than 0.5%, or less than 0.1% by mass of a saturated lipid.

The food product according to any of the above can be essentially free of cholesterol, or comprise less than 1.5%, less than 1%, less than 0.5%, less than 0.1%, or less than 0.05% by mass of cholesterol.

The food product according to any of the above can be essentially free of an emulsifying agent (e.g., any of the emulsifying agents disclosed herein).

The food product according to any of the above can be essentially free of lactose.

The food product according to any of the above can have an allergenicity that is lower than that of a comparable food product, such as, for example, an allergenicity of up to 0%, 1%, 5%, 10%, 15%, 20%, 25%, 30%, 35%, 40%, 45%, 50%, 55%, 60%, 65%, 70%, 75%, 80%, 85%, 90%, or 95% relative to that of a comparable food product.

The composition according to any of the above can be essentially free of one or more egg proteins (e.g., any of the egg proteins disclosed herein).

Dairy Attribute

The dairy substitute according to any of the above, or the composition comprising the dairy substitute according to any of the above, has a dairy attribute that is imparted or materially contributed to by the milk protein component comprised in the dairy substitute, or by the dairy substitute comprised in the composition, respectively.

The attribute can be a physical attribute, mechanical attribute, chemical/biological attribute, sensory attribute, or functional attribute, or any combination thereof.

Variables that can be titrated to modulate such attribute include type sand/or amounts of milk proteins comprised in the milk protein component (e.g., type and/or amount of recombinant milk protein provided herein, type and/or amount of recombinant milk protein not provided herein, type and/or amount of native milk protein), types and/or amounts of other ingredients comprised in the composition, and methods of manufacture of the dairy substitute or composition.

Physical Attribute

The dairy substitute according to any of the above, or the composition comprising the dairy substitute according to any of the above, can have a physical attribute that is a physical attribute of a dairy product, or that is a physical attribute imparted on or materially contributed to a comparable composition by milk, respectively, such as, for example, an appearance (e.g., color, translucence, opaqueness), a shape, a structure, a viscosity, a density, a solubility, a gelling point/profile (i.e., temperature and time line at which gel formation sets in), and/or a melting point/profile.

Appearance can be qualitatively assessed (e.g., color by a panel of human sensory experts), or quantitatively measured (e.g., color by spectroscopic analysis in L*a*b* color space). Shape can be qualitatively assessed, or quantitatively measured. Structure can be qualitatively assessed (e.g., by visual inspection) or quantitatively scored using microscopy. Viscosity and gelling point/profile can be qualitatively assessed (e.g., by rate or ease of flow, ease of movement during handling), or quantitatively measured using a viscometer or rheometer (e.g., using rotational viscometric methods, capillary viscometric methods, vibratory viscometric methods, ultrasonic pulse echo methods, pycnometric methods, or areometric methods). Density can be quantitatively measured by densymetric methods. Gelling point/profile and solubility can be quantitatively measured by methods known in the art. Melting point can be quantitatively measured using calorimetry.

The composition comprising the dairy substitute according to any of the above can have an appearance that is an appearance that is imparted on or materially contributed to a comparable composition by milk, such as, for example, a color (e.g., whitish color) that is similar to that imparted on or materially contributed to a comparable food product by milk.

Alternatively, the composition comprising the dairy substitute according to any of the above can have an appearance that is different from an appearance that is imparted on or materially contributed to a comparable composition by milk, such as, for example, a color that is different to that imparted on or materially contributed to a comparable food product by milk.

The dairy substitute according to any of the above can have a physical attribute (e.g., any of the physical attributes disclosed above, such as, for example, solubility), or a combination of two or more physical attributes (e.g., any combination of two or more of the physical attributes disclosed above), that is between 50% and 150%, 140%, 130%, 120%, 110%, 100%, 90%, 80%, 70%, or 60%; between 60% and 150%, 140%, 130%, 120%, 110%, 100%, 90%, 80%, or 70%; between 70% and 150%, 140%, 130%, 120%, 110%, 100%, 90%, or 80%; between 80% and 150%, 140%, 130%, 120%, 110%, 100%, or 90%; between 90% and 150%, 140%, 130%, 120%, 110%, or 100%; between 100% and 150%, 140%, 130%, 120%, or 110%; between 110% and 150%, 140%, 130%, or 120%; between 120% and 150%, 140%, or 130%; between 130% and 150%, or 140%; or between 140% and 150% of such physical attribute of milk, or that is at least 1.5-fold, at least 2-fold, at least 3-fold, at least 4-fold, at least 5-fold, at least 6-fold, at least 7-fold, at least 8-fold, at least 9-fold, at least 10-fold, at least 15-fold, or at least 20-fold of such physical attribute of milk.

The food product comprising the dairy substitute according to any of the above can have a physical attribute (e.g., any of the physical attributes disclosed above), or a combination of two or more physical attributes (e.g., any combination of two or more of the physical attributes disclosed above), that is between 50% and 150%, 140%, 130%, 120%, 110%, 100%, 90%, 80%, 70%, or 60%; between 60% and 150%, 140%, 130%, 120%, 110%, 100%, 90%, 80%, or 70%; between 70% and 150%, 140%, 130%, 120%, 110%, 100%, 90%, or 80%; between 80% and 150%, 140%, 130%, 120%, 110%, 100%, or 90%; between 90% and 150%, 140%, 130%, 120%, 110%, or 100%; between 100% and 150%, 140%, 130%, 120%, or 110%; between 110% and 150%, 140%, 130%, or 120%; between 120% and 150%, 140%, or 130%; between 130% and 150%, or 140%; or between 140% and 150% of such physical attribute of a comparable food product, or that is at least 1.5-fold, at least 2-fold, at least 3-fold, at least 4-fold, at least 5-fold, at least 6-fold, at least 7-fold, at least 8-fold, at least 9-fold, at least 10-fold, at least 15-fold, or at least 20-fold of such physical attribute of a comparable food product.

Mechanical Attribute

The dairy substitute according to any of the above, or the composition comprising the dairy substitute according to any of the above, can have a mechanical attribute that is a mechanical attribute of milk, or that is imparted on or materially contributed to a comparable composition by milk, respectively, such as, for example, a hardness/firmness, an adhesiveness, a resilience/recoverable energy, a structural integrity/cohesiveness, an elasticity/springiness/rebound, or a chewiness/breakdown.

Mechanical attributes can be quantitatively measuring using, for example, a texture analyzer (see Example 3).

The dairy substitute according to any of the above can have a mechanical attribute (e.g., any of the mechanical attributes disclosed above), or a combination of two or more mechanical attributes (e.g., any combination of two or more of the mechanical attributes disclosed above) that is between 50% and 150%, 140%, 130%, 120%, 110%, 100%, 90%, 80%, 70%, or 60%; between 60% and 150%, 140%, 130%, 120%, 110%, 100%, 90%, 80%, or 70%; between 70% and 150%, 140%, 130%, 120%, 110%, 100%, 90%, or 80%; between 80% and 150%, 140%, 130%, 120%, 110%, 100%, or 90%; between 90% and 150%, 140%, 130%, 120%, 110%, or 100%; between 100% and 150%, 140%, 130%, 120%, or 110%; between 110% and 150%, 140%, 130%, or 120%; between 120% and 150%, 140%, or 130%; between 130% and 150%, or 140%; or between 140% and 150% of such mechanical attribute of a milk, or that is at least 1.5-fold, at least 2-fold, at least 3-fold, at least 4-fold, at least 5-fold, at least 6-fold, at least 7-fold, at least 8-fold, at least 9-fold, at least 10-fold, at least 15-fold, or at least 20-fold of such mechanical attribute of milk.

The food product comprising the dairy substitute according to any of the above can have a mechanical attribute (e.g., any of the mechanical attributes disclosed above), or a combination of two or more mechanical attributes (e.g., any combination of two or more of the mechanical attributes disclosed above), that is between 50% and 150%, 140%, 130%, 120%, 110%, 100%, 90%, 80%, 70%, or 60%; between 60% and 150%, 140%, 130%, 120%, 110%, 100%, 90%, 80%, or 70%; between 70% and 150%, 140%, 130%, 120%, 110%, 100%, 90%, or 80%; between 80% and 150%, 140%, 130%, 120%, 110%, 100%, or 90%; between 90% and 150%, 140%, 130%, 120%, 110%, or 100%; between 100% and 150%, 140%, 130%, 120%, or 110%; between 110% and 150%, 140%, 130%, or 120%; between 120% and 150%, 140%, or 130%; between 130% and 150%, or 140%; or between 140% and 150% of such mechanical attribute of a comparable food product, or that is at least 1.5-fold, at least 2-fold, at least 3-fold, at least 4-fold, at least 5-fold, at least 6-fold, at least 7-fold, at least 8-fold, at least 9-fold, at least 10-fold, at least 15-fold, or at least 20-fold of such mechanical attribute of a comparable food product.

Chemical/Biological Attribute

The dairy substitute according to any of the above, or the composition comprising the dairy substitute according to any of the above, can have a chemical/biological attribute that is a chemical/biological attribute of milk, or that is imparted on or materially contributed to a comparable composition by milk, respectively, such as, for example, a nutrient content (e.g., types and/or amount of proteins, types and/or amount of amino acids, PDCAAS, BV), a pH, an absorption (e.g., proportion of absorbed protein from a food product), a digestibility (e.g., gastrointestinal digestibility), an oxidation stability, or a satiety regulation.

Nutrient content can be assessed using analytical methods known in the art, including but not limited to AOAC International reference methods AOAC 990.03 and AOAC 992.15, electrophoresis (e.g., SDS-PAGE), liquid column chromatography, immunochemical tests, or on-chip electrophoresis (e.g., using the Agilent Protein 80 kit and the Agilent 2100 Bioanalyzer) for determination of type and/or content of proteins and amino acids. Alternatively, chemical/biological attributes can be calculated from the nutrient contents of ingredients.

The dairy substitute according to any of the above can comprise between 3% and 100%, 90%, 80%, 70%, 60%, 50%, 40%, 30%, 20%, 10%, or 5%; between 5% and 100%, 90%, 80%, 70%, 60%, 50%, 40%, 30%, 20%, 10%; between 10% and 100%, 90%, 80%, 70%, 60%, 50%, 40%, 30%, or 20%; between 20% and 100%, 90%, 80%, 70%, 60%, 50%, 40%, or 30%; between 30% and 100%, 90%, 80%, 70%, 60%, 50%, or 40%; between 40% and 100%, 90%, 80%, 70%, 60%, or 50%; between 50% and 100%, 90%, 80%, 70%, or 60%; between 60% and 100%, 90%, 80%, or 70%; between 70% and 100%, 90%, or 80%; between 80% and 100%, or 90%; or between 90% and 100% by mass of protein.

The dairy substitute according to any of the above can have a PDCAAS of at least 0.8, at least 0.82, at least 0.84, at least 0.86, at least 0.88, at least 0.9, at least 0.92, at least 0.94, at least 0.96, or at least 0.98.

The dairy substitute according to any of the above can comprise between 5% and 30%, 25%, 20%, 15%, or 10%; between 10% and 30%, 25%, 20%, or 15%; between 15% and 30%, 25%, or 20%; between 20% and 30%, or 25%; or between 25% and 30% by dry mass of branched-chain amino acids.

The dairy substitute according to any of the above can have a BV of at least 80, at least 85, at least 90, at least 95, at least 100, at least 105, at least 110, at least 115, or at least 120.

Functional Attribute

The dairy substitute according to any of the above, or the composition comprising the dairy substitute according to any of the above, can have a functional attribute that is a functional attribute of milk, or that is imparted on or materially contributed to a comparable composition by milk, respectively, such as, for example, a foaming/leavening behavior (e.g., foaming capacity (i.e., capacity to form a foam, wherein the term "foam" as used herein refers to air bubbles dispersed in a solid or aqueous continuous phase), foam yield stress (i.e., stress required to initiate flow in the foam), foam stability (i.e., half-life of foam in response to a physical and/or chemical condition), foam drainage (i.e., rate at which a foam destabilizes and an aqueous phase begins to drain from the foam)), a gelling/thickening/coagulating behavior (e.g., gelling capacity (i.e., capacity to form a gel, wherein the term "gel" as used herein refers to a protein network with spaces filled with solvent linked by hydrogen bonds to the protein molecules), gelling profile (e.g., curve of gelling capacity over time, viscoelastic parameters as a function of temperature), gel strength (i.e., mechanical force required to break a gel surface of a defined area)), an emulsifying behavior (e.g., emulsifying capacity (i.e., capacity to stabilize an emulsion or the amount of oil that a given mass of sample can emulsify without destabilization), emulsion stability (i.e., half-life of an emulsion produced under given conditions, such as, for example, a given protein concentration, lipid concentration, pH, ionic strength, or preparation method)), a water binding behavior (e.g., water binding capacity (i.e., capacity to bind water), water binding strength), syneresis upon gelling (i.e., water weeping over time), aggregation behavior (e.g., aggregation capacity (i.e., capacity to form a precipitate (i.e., a tight protein network based on strong interactions between protein molecules and exclusion of solvent)), aggregate stability (e.g., upon heating, at various pHs, at various ion concentrations), ability to form micelles (i.e., generally or roughly spherical supramolecular structure that exist as a dispersion within a composition and that can encapsulate one or more biomolecules [e.g., water, minerals, vitamins)), interaction with other proteins (e.g., other milk proteins), and a use versatility (i.e., potential for varied use and production of a diversity of compositions).

Foaming/leavening behavior can be assessed using methods know in the art, including, for example, measurement of the percentage of air incorporated in a foam formed by a composition after whipping at a specified speed and for a specified amount of time under defined conditions (e.g., temperature, pH, ionic strength, protein concentration, carbohydrate concentration), measurement of how long it takes for a given mass of foam to destabilize in the form of liquid draining or seeping, measurement of yield stress under shear or the amount of stress required to initiate flow in a sample, and measurement of the height and degree of airy, light texture of a baked/cooked food product produced using the dairy substitute provided herein or milk.

Gelling/thickening/coagulating behavior can be assessed using methods known in the art, such as, for example, measurement of the time required for a composition to form a gel under defined conditions (e.g., temperature, pH, ionic strength, protein concentration, carbohydrate concentration), measurement of storage and elastic moduli and phase angle obtained in frequency sweeps on a rheometer, and measurement of resistance of a gel to a physical force and/or chemical condition (e.g., agitation, temperature, pH, ionic strength, protein concentration, sugar concentration, ionic strength) (see, for example, Ikeda et al. 2000. Biopolymers, 56: 109-119).

Emulsifying behavior can be assessed using methods know in the art, including, for example, preparation of a lipid in water emulsion under defined conditions (e.g., mixing apparatus, mixing speed, mixing time) and subsequent measurement of stability over time of phase separation in a mixture of lipid and water, measuring the rate of creaming or sedimentation, measuring the change in opacity over time, or measuring the change of dispersed phase particle size over time (see, for example, Liang et al. 2013. Food Hydrocolloids, 33, 297-308).

Water binding behavior can be assessed using methods know in the art, including, for example, measurement of the amount of water exuded by a sample after centrifugation, which is used to determine the amount of water bound per mass of protein, or development of moisture sorption isotherms based on mass of water bound per mass of protein as a function of vapor pressure.

The dairy substitute according to any of the above can have a functional attribute (e.g., any of the functional attributes disclosed above, including foaming capacity, foam yield stress, foam stability, foam drainage, gelling capacity, gel strength, aggregation capacity, aggregate stability, ability to form micelles, emulsifying capacity, emulsion stability, water binding capacity, and syneresis upon gelling), or a combination of two or more functional attributes (e.g., any combination of two or more of the functional attributes disclosed above), that is between 50% and 150%, 140%, 130%, 120%, 110%, 100%, 90%, 80%, 70%, or 60%; between 60% and 150%, 140%, 130%, 120%, 110%, 100%, 90%, 80%, or 70%; between 70% and 150%, 140%, 130%, 120%, 110%, 100%, 90%, or 80%; between 80% and 150%, 140%, 130%, 120%, 110%, 100%, or 90%; between 90% and 150%, 140%, 130%, 120%, 110%, or 100%; between 100% and 150%, 140%, 130%, 120%, or 110%; between 110% and 150%, 140%, 130%, or 120%; between 120% and 150%, 140%, or 130%; between 130% and 150%, or 140%; or between 140% and 150% of such functional attribute of milk, or that is at least 1.5-fold, at least 2-fold, at least 3-fold, at least 4-fold, at least 5-fold, at least 6-fold, at least 7-fold, at least 8-fold, at least 9-fold, at least 10-fold, at least 15-fold, or at least 20-fold of such mechanical attribute of milk.

The dairy substitute according to any of the above can have a use versatility (i.e., ability to use the dairy substitute in a variety of manners and/or to derive a diversity of other compositions from the dairy substitute) that is similar to that of milk. A non-limiting example of such use versatility is production of any of the food products provided herein that comprise the dairy substitute (e.g., yoghurt, cheese, cream, butter) and ability to form protein dimers.

Sensory Attribute

The dairy substitute according to any of the above, or the composition comprising the dairy substitute according to any of the above, can have a sensory attribute that is a sensory attribute of milk, or that is imparted on or materially contributed to a comparable composition by milk, respectively, such as, for example, a taste/flavor, an aroma, or an eating quality (e.g., fattiness, creaminess, richness, greasiness, thickness, hardness/firmness, crispiness, crumbliness, crunchiness, chewiness, chewdown, tenderness, compactness, cohesiveness, adhesiveness, graininess, smoothness, juiciness, wetness, mouthcoating, slipperiness on tongue, roughness, abrasiveness, uniformity of bite and/or chew, springiness, texture, airiness, effort required to draw sample from spoon over tongue).

Sensory attributes can be qualitatively assessed by a panel of sensory experts, or derived from correlated physical, mechanical, chemical, and/or functional attributes that impact textural and sensory perceptions (e.g., hardness/firmness, adhesiveness, resilience/recoverable energy, structure integrity/cohesiveness, elasticity/springiness/rebound, chewiness/breakdown, density, viscosity, content/size/shape of solid particles, water binding).

The food product comprising the dairy substitute according to any of the above can have a sensory attribute (e.g., taste/flavor, eating quality) that is similar to that imparted on or materially contributed to a comparable food product by milk.

Alternatively, the food product comprising the dairy substitute according to any of the above can have a sensory attribute (e.g., taste/flavor, eating quality) that is different to that imparted on or materially contributed to a comparable food product by milk, such as, for example, a non-milk taste/flavor or a neutral taste/flavor (i.e., not affecting the taste/flavor of the food product).

Method for Producing Recombinant Milk Proteins with Non-Native PTMs

In another aspect, provided herein is a method for producing the dairy substitute provided herein. The method comprises the step of obtaining one or more native and/or recombinant milk proteins, including one or more recombinant milk proteins having one or more non-native PTMs as provided herein.

A recombinant milk protein can be obtained by culturing a suitable recombinant host cell comprising a recombinant polynucleotide (e.g., recombinant vector) encoding the recombinant milk protein in a culture medium under conditions suitable for production and/or secretion of the recombinant milk protein. The method can further comprise the steps of: a) obtaining a recombinant polynucleotide encoding the milk protein, and introducing the recombinant polynucleotide into host cell to obtain the recombinant host cell; and/or b) isolating (i.e., purifying) the recombinant milk protein; and/or c) post-processing the recombinant milk protein.

Alternatively, a recombinant milk protein can be obtained using in vitro methods (e.g., using cell-free transcription and/or translation systems).

A native milk protein can be isolated from milk. Methods for isolating protein from natural sources are known and used to produce protein isolates, protein concentrates, protein flours, and partially purified or purified proteins.

Recombinant Polynucleotide

The recombinant polynucleotide comprised in the recombinant host cell can be prepared by any suitable method known in the art, including, without limitation, direct chemical synthesis and cloning.

The recombinant polynucleotide typically comprises one or more expression cassettes, wherein each expression cassette comprises: a promoter (e.g., a fungal promoter), an optional signal sequence (i.e., a sequence that encodes a peptide that mediates the delivery of a nascent protein attached to the peptide to the exterior of the cell in which the nascent protein is synthesized (i.e., a sequence that encodes a peptide that mediates secretion of the recombinant protein)), a sequence encoding the milk protein, and a termination sequence (or multiple termination sequences), wherein the promoter is operably linked in sense orientation to the optional signal sequence (i.e., the promoter and optional signal sequence and subsequent sequence encoding the milk protein are positioned such that the promoter is effective for regulating transcription of the optional signal sequence and sequence encoding the milk protein), the optional signal sequence is operably linked in sense orientation to the sequence encoding the milk protein (i.e., the signal sequence and sequence encoding the milk protein are positioned such that transcription and translation produces the milk protein comprising a functional signal sequence), and the termination sequence is operably linked to the sequence encoding the milk protein (i.e., the sequence encoding the milk protein and the termination sequence are positioned such that the terminator is effective for terminating transcription of the optional signal sequence and sequence encoding the milk protein).

The promoter may be any suitable promoter that is functional in the recombinant host cell. In some embodiments, the promoter is a constitutive promoter. In other embodiments, the promoter is an inducible promoter or a repressible promoter (e.g., a promoter that is induced or repressed in the presence of glucose, galactose, lactose, sucrose, cellulose, sophorose, gentiobiose, sorbose, disaccharides that induce the cellulase promoters, starch, tryptophan, or phosphate).

Non-limiting examples of suitable promoters for use in recombinant fungal host cells include promoters, and functional parts thereof, of genes encoding any of the following proteins: glucoamylase (e.g., glaA of *Aspergillus niger, Aspergillus awamori, Aspergillus japonicus, Aspergillus tubingensis, Aspergillus foetidus,* or *Aspegillus carbonarius*), amylase (e.g., *Aspergillus oryzae* TAKA amylase, *Aspergillus niger* neutral alpha-amylase, *Aspergillus niger* acid stable alpha-amylase, fungal α-amylase [amy], bacterial alpha-amylase), protease (e.g., *Rhizomucor miehei* aspartic protease, *Aspergillus oryzae* alkaline protease, *Fusarium oxysporum* trypsin-like protease, *Trichoderma reesei* protease), lipase (e.g., *Rhizomucor miehei* lipase), isomerase (e.g., *Aspergillus oryzae* triose phosphate isomerase, fungal triose phosphate isomerase [tpi], yeast triosephosphate isomerase), acetamidase (e.g., *Aspergillus nidulans* or *Aspergillus oryzae* or other fungal acetamidase [amdS]), dehydrogenase (e.g., fungal alcohol dehydrogenase [adhA], fungal glyceraldehyde-3-phosphate dehydrogenase [gpd], yeast alcohol dehydrogenase), xylanase (e.g., fungal xylanase [xlnA], *Trichoderma* xylanases [xyn1, xyn2, bx11]), kinase (e.g., yeast 3-phosphoglycerate kinase), hydrolase (e.g., fungal cellobiohydrolase I [cbh1], *Trichoderma* hydrolases [cbh2, egl1, egl2]), phosphatase (e.g., *Fusarium* acid phosphatase), and other fungal proteins (e.g., fungal endo α-L-arabinase [abnA], fungal α-L-arabinofuranosidase A [abfA], fungal α-L-arabinofuranosidase B [abfB], fungal phytase, fungal ATP-synthetase, fungal sub-unit 9 [oliC], fungal sporulation-specific protein [Spo2], fungal SSO, yeast alcohol oxidase, yeast lactase, *Neurospora crassa* CPC1, *Aspergillus nidulans* trpC, fungal chitinolytic enzymes [e.g., endo- & exo-chitinase, beta-glucanase], fungal VAMP-associated proteins [VAPs], fungal translation elongation factor [TEF1], fungal DNA damage-responsive protein [DDRP], fungal [e.g., *Fusarium* or *Neurospora crassa*] hexagonal peroxisome [Hex1], fungal [e.g., *Neurospora crassa*] catalase), and any other protein produced at high level in the recombinant fungal host cell.

Non-limiting examples of suitable promoters for use in recombinant bacterial or yeast host cells include promoters, and functional parts thereof, of genes encoding any of the following proteins: LAC4, T7 polymerase, TAC, GAL1, λPL, λPR, beta-lactamase, spa, CYC1, TDH3, GPD, TEF1, ENO2, PGL1, GAP, SUC2, ADH1, ADH2, HXT7, PHO5, CLB1, AOX1, cellulase, amylase, protease, xylanase, and any other protein produced at high level in the recombinant bacterial or yeast host cell, such as, for example, promoters of a stress (e.g., heat shock) response genes (e.g., hac1, BIP).

The signal sequence may be any suitable signal sequence that is functional in the recombinant host cell. Non-limiting examples of suitable signal sequences for use in recombinant fungal host cells include signal sequences from *Trichoderma reesei* (e.g., signal sequence of Cbh1, cbh2, egl1, egl2, xyn1, xyn2, bxl1, hfb1, or hfb2), signal sequences from *Aspergillus niger* (e.g., signal sequence of glaA, amyA, amyC, or aamA), signal sequences from yeast (e.g., signal sequence of alpha mating factor [MFa]), and functional parts thereof. Non-limiting examples of suitable signal sequences for use in recombinant yeast host cells include signal sequences from yeast (e.g., signal sequence of alpha mating factor [MFa]), and functional parts thereof.

The termination sequence may be any suitable termination sequence that is functional in the recombinant host cell. Non-limiting examples of suitable termination sequences for use in recombinant fungal host cells include but are not limited to termination sequences of *Aspergillus oryzae* (e.g., termination sequence of TAKA amylase gene), *Aspergillus niger* (e.g., termination sequence of glaA, gpdA, aamA, trpC, pdc1, adh1, amdS, or tef1 gene), *Fusarium oxysporum* (e.g., termination sequence of serine protease [trypsin] gene), *Trichoderma reesei* (e.g., termination sequence of cbh1, pdc1, TEF1, gpd1, xyn1, or adh1 gene), *Pichia pastoris* (e.g., termination sequence of aox1, gap1, adh1, tef1, tps1, or pgk1 gene), *Saccharomyces cerevisiae* (e.g., termination sequence of adh1, cyc1, gal1, tef1, pdc1, pgk1, or tps1 gene), synthetic termination sequences, and any combination of the above listed sequences. Non-limiting examples of suitable termination sequences for use in recombinant yeast host cells include but are not limited to the PGK1 and TPS1 termination sequences.

The recombinant polynucleotide can further include additional elements. Non-limiting examples of such additional elements include enhancer sequences, response elements, protein recognition sites, inducible elements, protein-binding sequences, 5' and 3' untranslated regions, polyadenylation sequences, introns, origins of replication, operators (i.e., polynucleotide adjacent to a promoter that comprise a protein-binding domain where a repressor protein can bind and reduce or eliminate activity of the promoter), and selection markers (i.e., genes that encode proteins that can complement the host cell's auxotrophy, provide antibiotic resistance, or result in a color change). Such elements are known in the art. Non-limiting examples of origins of replication include AMA1 and ANSI. Non-limiting examples of suitable selection markers include amdS (acetamidase), argB (ornithine carbamoyltransferase), bar (phosphinothricin acetyltransferase), hph (hygromycin phosphotransferase), niaD (nitrate reductase), pyrG (orotidine 5'-phosphate decarboxylase), sC (sulfate adenyltransferase), and trpC (anthranilate synthase), and derivatives thereof. In some embodiments, the selection marker comprises an alteration that decreases production of the selective marker, thus increasing the number of copies needed to permit a host cell comprising the polynucleotide to survive under selection.

In embodiments in which the recombinant polynucleotide comprises two or more expression cassettes, the operably linked promoters, optional signal sequences, sequences encoding polypeptide termination sequences, and optional additional elements can be identical or different between the two or more expression cassettes.

Recombinant Host Cell

Methods for introducing a recombinant polynucleotide into a host cell to obtain a recombinant host cell are well-known in the art. Non-limiting examples of such methods include calcium phosphate transfection, dendrimer transfection, liposome transfection (e.g., cationic liposome transfection), cationic polymer transfection, cell squeezing, sonoporation, optical transfection, protoplast fusion, impalefection, hyrodynamic delivery, gene gun, magnetofection, viral transduction, electroporation and chemical transformation (e.g., using PEG).

The recombinant polynucleotide can be maintained extrachromosomal in the recombinant host cell on an expression vector (i.e., a polynucleotide that transduces, transforms, or infects a host cell, and causes it to express a polynucleotide and/or a polypeptide other than those native to the host cell, or in a manner not native to the host cell), or can be stably integrated within the genome (e.g., a chromosome) of the recombinant host cell. For integration into the genome, the recombinant polynucleotide can comprise sequences for integration into the genome by homologous (i.e., targeted integration) or nonhomologous recombination. The recombinant polynucleotide may comprise at least 100, at least 250, at least 500, at least 750, at least 1,000, or at least 10,000 base pairs that are highly homologous with a target sequence in the genome of the recombinant host cell to enhance the probability of homologous recombination. Such highly homologous sequence may be non-coding or coding. More than one copy of the recombinant polynucleotide may be inserted into the recombinant host cell to increase production of the recombinant milk protein.

The recombinant host cell can be obtained from host cells obtained from any organism, including but not limited to any animal, plant, algae fungus (e.g., yeast, filamentous fungus), or bacterium, as well as any generally recognized as safe (GRAS) industrial strain.

Non-limiting examples of suitable plants include cycad, *Ginkgo biloba*, conifer, cypress, juniper, *thuja*, cedarwood, pine, *angelica*, caraway, coriander, cumin, fennel, parsley, dill, dandelion, helichrysum, marigold, mugwort, safflower, camomile, lettuce, wormwood, calendula, citronella, sage, thyme, chia seed, mustard, olive, coffee, *capsicum*, eggplant, paprika, cranberry, kiwi, vegetables (e.g., carrot, celery), tagete, tansy, tarragon, sunflower, wintergreen, basil, hyssop, lavender, lemon *verbena*, marjoram, melissa, patchouli, pennyroyal, peppermint, rosemary, sesame, spearmint, primrose, samara, pepper, pimento, potato, sweet potato, tomato, blueberry, nightshade, *petunia*, morning glory, lilac, jasmin, honeysuckle, snapdragon, *psyllium*, wormseed, buckwheat, amaranth, chard, *quinoa*, spinach, rhubarb, jojoba, cypselea, *chlorella*, manila, hazelnut, canola, kale, bok choy, rutabaga, frankincense, myrrh, elemi, hemp, pumpkin, squash, curcurbit, manioc, *dalbergia*, legume plants (e.g., alfalfa, lentil, bean, clover, pea, fava coceira, frijole bola roja, frijole negro, *lespedeza*, licorice, lupin, mesquite, carob, soybean, peanut, tamarind, *wisteria, cassia*, chickpea/garbanzo, fenugreek, green pea, yellow pea, snow pea, lima bean, fava bean), geranium, flax, pomegranate, cotton, okra, neem, fig, mulberry, clove, *eucalyptus*, tea tree, niaouli, fruiting plant (e.g., apple, apricot, peach, plum, pear, nectarine), strawberry, blackberry, raspberry, cherry, prune, rose, tangerine, citrus (e.g., grapefruit, lemon, lime, orange, bitter orange, mandarin, tangerine), mango, citrus bergamot, buchu, grape, broccoli, brussels sprout, camelina, cauliflower, rape, rapeseed (canola), turnip, cabbage, cucumber, watermelon, honeydew melon, zucchini, birch, walnut, cassava, baobab, allspice, almond, breadfruit, sandalwood, macadamia, taro, tuberose, aloe vera, garlic, onion, shallot, vanilla, *yucca*, vetiver, galangal, barley, corn, *curcuma aromatica*, ginger, lemon grass, oat, palm, pineapple, rice, rye, sorghum, triticale, turmeric, yam, bamboo, barley, cajuput, *canna*, cardamom, maize, oat, wheat, cinnamon, *sassafras, lindera benzoin*, bay laurel, avocado, ylang-ylang, mace, nutmeg, moringa, horsetail, oregano, cilantro, chervil, chive, aggregate fruit, grain plant, herbal plant, leafy vegetable, non-grain legume plant, nut plant, succulent plant, land plant, water plant, delbergia, millet, drupe, schizocarp, flowering plant, non-flowering plant, cultured plant, wild plant, tree, shrub, flower, grass, herbaceous plant, brush, lianas, cacti, tropical plant, subtropical plant, temperate plant, and moss (e.g., *Physcomitrella patens*).

Non-limiting examples of suitable algea include members of any of the following genera, and derivatives or crosses thereof: red algae, brown algae, gree algae, microalgae, *Acinetobacter, Achnanthes* (e.g., *Achnanthes orientalis*), *Agmenellum, Alaria* (e.g., *Alaria marginata*), *Amphiprora* (e.g., *Amphiprora hyaline*), *Amphora* (e.g., *Amphora coffeiformis, Amphora coffeiformis linea, Amphora coffeiformis punctata, Amphora coffeiformis taylori, Amphora coffeiformis tenuis, Amphora delicatissima, Amphora delicatissima capitata, Amphora* sp.), *Anabaena, Analipus* (e.g., *Analipus japonicus*), *Ankistrodesmus* (e.g., *Ankistrodesmus falcatus*), *Ascophyllum* (e.g., *Ascophyllum nodosum*), *Boekelovia* (e.g., *Boekelovia hooglandii*), *Borodinella* (e.g., *Borodinella* sp.), *Botryococcus* (e.g., *Botryococcus braunii, Botryococcus sudeticus*), *Carteria, Chaetoceros* (e.g., *Chaetoceros gracilis, Chaetoceros muelleri, Chaetoceros muelleri subsalsum, Chaetoceros* sp.), *Chlorella* (e.g., *Chlorella anitrata, Chlorella Antarctica, Chlorella aureoviridis, Chlorella candida, Chlorella capsulate, Chlorella desiccate, Chlorella ellipsoidea, Chlorella emersonii, Chlorella fusca, Chlorella fusca* var. *vacuolata, Chlorella glucotropha, Chlorella infusionum, Chlorella infusionum* var. *actophila, Chlorella infusionum* var. *auxenophila, Chlorella kessleri, Chlorella lobophora* (strain SAG 37.88), *Chlorella luteoviridis, Chlorella luteoviridis* var. *aureoviridis, Chlorella luteoviridis* var. *lutescens, Chlorella miniata, Chlorella minutissima, Chlorella mutabilis, Chlorella nocturna, Chlorella parva, Chlorella photophila, Chlorella pringsheimii, Chlorella protothecoides, Chlorella protothecoides* var. *acidicola, Chlorealla, Chlorella regularis, Chlorella regularis* var. *minima, Chlorella regularis* var. *umbricata, Chlorella reisiglii, Chlorella saccharophila, Chlorella saccharophila* var. *ellipsoidea, Chlorella salina, Chlorella simplex, Chlorella sorokiniana, Chlorella* sp., *Chlorella sphaerica, Chlorella stigmatophora, Chlorella vanniellii, Chlorella vulgaris, Chlorella vulgaris, Chlorella vulgaris f tertia, Chlorella vulgaris* var. *autotrophica, Chlorella vulgaris* var. *viridis, Chlorella vulgaris* var. *vulgaris, Chlorella vulgaris* var. *vulgaris f tertia, Chlorella vulgaris* var. *vulgaris f viridis, Chlorella xanthella, Chlorella zofingiensis, Chlorella trebouxioides, Chlorella vulgaris*), *Chlorococcum* (e.g., *Chlorococcum infusionum, Chlorococcum* sp.), *Chlorogonium, Chondrus* (e.g., *Chondrus crispus, Chondrus ocellatus*), *Chroomonas* (e.g., *Chroomonas* sp.), *Chrysosphaera* (e.g., *Chrysosphaera* sp.), *Cricosphaera* (e.g., *Cricosphaera* sp.), *Cryptomonas* (e.g., *Cryptomonas* sp.), *Cyclotella* (e.g., *Cyclotella cryptica, Cyclotella meneghiniana, Cyclotella* sp.), *Dunaliella* (e.g., *Dunaliella* sp., *Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta*), *Ecklonia* (e.g., *Ecklonia* sp), *Eisenia* (e.g., *Eisenia bicyclis*), *Ellipsoidon* (e.g., *Ellipsoidon* sp.), *Eremosphaera* (e.g., *Eremosphaera viridis, Eremosphaera* sp.), *Eucheuma* (e.g., *Eucheuma cottonii, Eucheuma spinosum*), *Euglena, Fragilaria* (e.g., *Fragilaria crotonensis, Fragilaria* sp.), *Franceia* (e.g., *Franceia* sp.), *Furcellaria* (e.g., *Furcellaria fastigiate*), *Gigartina* (e.g., *Gigartina acicularis, Gigartina bursa-pastoris, Gigartina pistillata, Gigartina radula, Gigartina skottsbergii, Gigartina stellate*), *Gleocapsa* (e.g., *Gleocapsa* sp.), *Gloeothamnion* (e.g., *Gloeothamnion* sp.), *Gloiopeltis* (e.g., *Gloiopeltis furcate*), *Gracilaria* (e.g., *Gracilaria bursa-pastoris, Gracilaria lichenoides*), *Hizikia* (e.g., *Hizikia fusiforme*), *Hymenomonas* (e.g., *Hymenomonas* sp.), *Isochrysis* (e.g., *Isochrysis aff galbana, Isochrysis galbana*), *Kjellmaniella* (e.g., *Kjellmaniella gyrate*), *Laminaria* (e.g., *Laminaria angustata, Laminaria longirruris, Laminaria Longissima, Laminaria ochotensis, Laminaria claustonia, Laminaria saccharina, Laminaria digitata, Laminaria japonica*), *Lepocinclis, Macrocystis* (e.g., *Macrocystis pyrifera*), *Micractinium, Monoraphidium* (e.g., *Monoraphidium minutum, Monoraphidium* sp.), *Nannochloris* (e.g., *Nannochloris* sp.), *Nannochloropsis* (e.g., *Nannochloropsis salina, Nannochloropsis* sp.), *Navicula* (e.g., *Navicula acceptata, Navicula biskanterae, Navicula pseudotenelloides, Navicula pelliculosa, Navicula saprophila, Navicula* sp.), *Nephrochloris* (e.g., *Nephrochloris* sp.), *Nephroselmis* (e.g., *Nephroselmis* sp.), *Nitzschia* (e.g., *Nitzschia communis, Nitzschia alexandrina, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia* sp.), *Ochromonas* (e.g., *Ochromonas* sp.), *Oocystis* (e.g., *Oocys-* tis parva, Oocystis pusilla, Oocystis sp.), Oscillatoria (e.g., Oscillatoria limnetica, Oscillatoria sp., Oscillatoria subbrevis), Palmaria (e.g., Palmaria palmata), Pascheria (e.g., Pascheria acidophila), Pavlova (e.g., Pavlova sp.), Petalonia (e.g., Petalonia fascia), Phagus, Phormidium, Platymonas (e.g., Platymonas sp.), Pleurochrysis (e.g., Pleurochrysis carterae, Pleurochrysis dentate, Pleurochrysis sp.), Porphyra (e.g., Porphyra columbina, Porphyra crispata, Porhyra deutata, Porhyra perforata, Porhyra suborbiculata, Porphyra tenera), Porphyridium (e.g., Porphyridium cruentum, Porphyridium purpureum, Porphyridium aerugineum), Prototheca (e.g., Prototheca wickerhamii, Prototheca stagnora, Prototheca portoricensis, Prototheca moriformis, Prototheca zopfii), Pyramimonas (e.g., Pyramimonas sp.), Pyrobotrys, Rhodella (e.g., Rhodella maculate, Rhodella reticulata, Rhodella violacea), Rhodymenia (e.g., Rhodymenia palmata), Sarcinoid (e.g., Sarcinoid chrysophyte), Scenedesmus (e.g., Scenedesmus armatus), Scytosiphon (e.g., Scytosiphon lome), Spirogyra, Spirulina (e.g., Spirulina platensis), Stichococcus (e.g., Stichococcus sp.), Synechococcus (e.g., Synechococcus sp.), Tetraedron, Tetraselmis (e.g., Tetraselmis sp., Tetraselmis suecica), Thalassiosira (e.g., Thalassiosira weissflogii), and Viridiella (e.g., Viridiella fridericiana).

Non-limiting examples of suitable yeast include members of any of the following genera, and derivatives or crosses thereof: Candida (e.g., Candida albicans, Candida etchellsii, Candida guilliermondii, Candida humilis, Candida lipolytica, Candida orthopsilosis, Candida palmioleophila, Candida pseudotropicalis, Candida sp., Candida utilis, Candida versatilis), Cladosporium, Cryptococcus (e.g., Cryptococcus terricolus, Cryptococcus curvatus), Debaryomyces (e.g., Debaryomyces hansenii), Endomyces (e.g., Endomyces vernalis), Endomycopsis (e.g., Endomycopsis vernalis), Eremothecium (e.g., Eremothecium ashbyii), Hansenula (e.g., Hansenula sp., Hansenula polymorpha), Kluyveromyces (e.g., Kluyveromyces sp., Kluyveromyces lactis, Kluyveromyces marxianus var. lactis, Kluyveromyces marxianus, Kluyveromyces thermotolerans), Lipomyces (e.g., Lipomyces starkeyi, Lipomyecs lipofer), Ogataea (e.g., Ogataea minuta), Pichia (e.g., Pichia sp., Pichia pastoris, Pichia finlandica, Pichia trehalophila, Pichia koclamae, Pichia membranaefaciens, Pichia minuta, Pichia lindneri), Pichia opuntiae, Pichia thermotolerans, Pichia salictaria, Pichia guercuum, Pichia pijperi, Pichia stiptis, Pichia methanolica), Rhodosporidium (e.g., Rhodosporidium toruloides), Rhodotorula (e.g., Rhodotorula sp., Rhodotorula gracilis, Rhodotorula glutinis, Rhodotorula graminis), Saccharomyces (e.g., Saccharomyces sp., Saccharomyces bayanus, Saccharomyces beticus, Saccharomyces cerevisiae, Saccharomyces chevalieri, Saccharomyces diastaticus, Saccharomyces ellipsoideus, Saccharomyces exiguus, Saccharomyces florentinus, Saccharomyces fragilis, Saccharomyces pastorianus, Saccharomyces pombe, Saccharomyces sake, Saccharomyces uvarum), Sporobolomyces (e.g., Sporobolomyces roseus), Sporidiobolus (e.g., Sporidiobolus johnsonii, Sporidiobolus salmonicolor), Trichosporon (e.g., Trichosporon cacaoliposimilis, Trichosporon oleaginosus sp. nov., Trichosporon cacaoliposimilis sp. nov., Trichosporon gracile, Trichosporon dulcitum, Trichosporon jirovecii, Trichosporon insectorum), Xanthophyllomyces (e.g., Xanthophyllomyces dendrorhous), Yarrowia (e.g., Yarrowia lipolytica), and Zygosaccharomyces (e.g., Zygosaccharomyces rouxii).

Non-limiting examples of suitable filamentous fungi include holomorphic, teleomorphic, and anamorphic forms of fungi, including members of any of the following genera, and derivatives or cross thereof: Acremonium (e.g., Acremonium alabamense), Aspergillus (e.g., Aspergillus aculeatus, Aspergillus awamori, Aspergillus clavatus, Aspergillus flavus, Aspergillus foetidus, Aspergillus fumigatus, Aspergillus japonicus, Aspergillus nidulans, Aspergillus niger, Aspergillus niger var. awamori, Aspergillus ochraceus, Aspergillus oryzae, Aspergillus sojae, Aspergillus terreus, as well as Emericella, Neosartorya, and Petromyces species), Aureobasidium, Canariomyces, Chaetomium, Chaetomidium, Corynascus, Chrysosporium (e.g., Chrysosporium botryoides, Chrysosporium carmichaeli, Chrysosporium crassitunicatum, Chrysosporium europae, Chrysosporium evolceannui, Chrysosporium farinicola, Chrysosporium fastidium, Chrysosporium filiforme, Chrysosporium georgiae, Chrysosporium globiferum, Chrysosporium globiferum var. articulatum, Chrysosporium globiferum var. niveum, Chrysosporium hirundo, Chrysosporium hispanicum, Chrysosporium holmii, Chrysosporium indicum, Chrysosporium iops, Chrysosporium keratinophilum, Chrysosporium kreiselii, Chrysosporium kuzurovianum, Chrysosporium lignorum, Chrysosporium obatum, Chrysosporium lucknowense, Chrysosporium lucknowense Garg 27K, Chrysosporium medium, Chrysosporium medium var. spissescens, Chrysosporium mephiticum, Chrysosporium merdarium, Chrysosporium merdarium var. roseum, Chrysosporium minor, Chrysosporium pannicola, Chrysosporium parvum, Chrysosporium parvum var. crescens, Chrysosporium pilosum, Chrysosporium pseudomerdarium, Chrysosporium pyriformis, Chrysosporium queenslandicum, Chrysosporium sigleri, Chrysosporium sulfureum, Chrysosporium synchronum, Chrysosporium tropicum, Chrysosporium undulatum, Chrysosporium vallenarense, Chrysosporium vespertilium, Chrysosporium zonatum), Coonemeria, Cunninghamella (e.g., Cunninghamella ehinulata), Dactylomyces, Emericella, Filibasidium, Fusarium (e.g., Fusarium moniliforme, Fusarium venenatum, Fusarium oxysporum, Fusarium graminearum, Fusarium proliferatum, Fusarium verticiollioides, Fusarium culmorum, Fusarium crookwellense, Fusarium poae, Fusarium sporotrichioides, Fusarium sambuccinum, Fusarium torulosum, as well as associated Gibberella teleomorphic forms thereof), Gibberella, Humicola, Hypocrea, Lentinula, Malbranchea (e.g., Malbranchea filamentosa), Magnaporthe, Malbranchium, Melanocarpus, Mortierella (e.g., Mortierella alpina 1S-4, Mortieralla isabelline, Mortierrla vinacea, Mortieralla vinaceae var. raffinoseutilizer), Mucor (e.g., Mucor miehei Cooney et Emerson (Rhizomucor miehei (Cooney & R. Emerson)) Schipper, Mucor pusillus Lindt, Mucor circinelloides Mucor mucedo), Myceliophthora (e.g., Myceliophthora thermophila), Myrothecium, Neocallimastix, Neurospora (e.g., Neurospora crassa), Paecilomyces, Penicillium (e.g., Penicillium chrysogenum, Pennicillium iilacinum, Penicillium roquefortii), Phenerochaete, Phlebia, Piromyces, Pythium, Rhizopus (e.g., Rhizopus niveus), Schizophyllum, Scytalidium, Sporotrichum (e.g., Sporotrichum cellulophilum), Stereum, Talaromyces, Thermoascus, Thermomyces, Thielavia (e.g., Thielavia terrestris), Tolypocladium, and Trichoderma (e.g., Trichoderma harzianum, Trichoderma koningii, Trichoderma longibrachiatum, Trichoderma reesei, Trichoderma atroviride, Trichoderma virens, Trichoderma citrinoviride, Trichoderma viride).

Non-limiting examples of suitable bacteria include firmicute, cyanobacteria (blue-green algae), oscillatoriophcideae, bacillales, lactobacillales, oscillatoriales, bacillaceae, lactobacillaceae, and members of any of the following genera, and derivatives and crosses thereof: Acinetobacter, Acetobacter (e.g., Acetobacter suboxydans, Acetobacter xylinum), Actinoplane (e.g., Actinoplane *missouriensis*), Arthrospira (e.g., Arthrospira *platensis*, Arthrospira maxima), *Bacillus* (e.g., *Bacillus cereus, Bacillus coagulans, Bacillus licheniformis, Bacillus stearothermophilus, Bacillus subtilis*), *Escherichia* (e.g., *Escherichia coli*), *Lactobacillus* (e.g., *Lactobacillus acidophilus, Lactobacillus bulgaricus*), *Lactococcus* (e.g., *Lactococcus lactis, Lactococcus lactis* Lancefield Group N, *Lactobacillus reuteri*), *Leuconostoc* (e.g., *Leuconostoc citrovorum, Leuconostoc dextranicum, Leuconostoc mesenteroides*), *Micrococcus* (e.g., *Micrococcus lysodeikticus*), *Rhodococcus* (e.g., *Rhodococcus opacus, Rhodococcus opacus* strain PD630), *Spirulina, Streptococcus* (e.g., *Streptococcus cremoris, Streptococcus lactis, Streptococcus lactis* subspecies *diacetylactis, Streptococcus thermophilus*), *Streptomyces* (e.g., *Streptomyces chattanoogensis, Streptomyces griseus, Streptomyces natalensis, Streptomyces olivaceus, Streptomyces olivochromogenes, Streptomyces rubiginosus*), *Tetrahymena* (e.g., *Tetrahymena thermophile, Tetrahymena hegewischi, Tetrahymena hyperangularis, Tetrahymena malaccensis, Tetrahymena pigmentosa, Tetrahymena pyriformis, Tetrahymena vorax*), and *Xanthomonas* (e.g., *Xanthomonas campestris*).

The recombinant host cell can further comprise a genetic modification that improves production of the recombinant milk protein. Non-limiting examples of suitable genetic modifications include altered promoters, altered kinase activities, altered phosphatase activities, altered protein folding activities, altered protein secretion activities, and altered gene expression induction pathways.

The recombinant host cell can further have reduced or essentially eliminated activity of a protease so as to minimize degradation of the recombinant milk protein (see, for example, PCT application WO 96/29391). Recombinant host cells with reduced or essentially eliminated activity of a protease can be obtained by screening of mutants or by specific genetic modification as per methods known in the art.

The recombinant host cell can further comprise a native or recombinant glycosyltransferase. Non-limiting examples of suitable endogenous or recombinant glycosyltransferases include fucosyltransferases, galactosyltransferases, glucosyltransferases, xylosyltransferases, acetylases, glucoronyltransferases, glucoronylepimerases, sialyltransferases, mannosyltransferases, sulfotransferases, β-acetylgalactosaminyltransferases, and N-acetylglucosaminyltransferases.

The recombinant host cell can further comprise a native or recombinant kinase or phosphatase. Non-limiting examples of suitable native or recombinant kinases or phosphatases include protein kinase A, protein kinase B, protein kinase C, creatine kinase B, protein kinase C beta, protein kinase G, TmkA, Fam20 kinases (e.g., Fam20C), ATM, CaM-II, cdc2, cdk5, CK1, CMI, DNAPK, EGFR, GSK3, INSR, p38MAPK, RSK, SRC, phosphotransferases, alkaline phosphatase (e.g., UniProtKB-O77578), acid phosphatase, and others (see, for example, Kabir & Kazi. 2011. Genet Mol Biol. 34(4):587).

Culturing Recombinant Host Cell

Suitable conditions for production of the recombinant milk protein provided herein are those under which the recombinant host cell can grow and/or remain viable, and produce the recombinant milk protein provided herein. Non-limiting examples of suitable conditions include a suitable culture medium (e.g., a culture medium having a suitable nutrient content [e.g., a suitable carbon content, a suitable nitrogen content, a suitable phosphorus content], a suitable supplement content, a suitable trace metal content, a suitable pH), a suitable temperature, a suitable feed rate, a suitable pressure, a suitable level of oxygenation, a suitable fermentation duration (i.e., volume of culture media comprising the recombinant host cells), a suitable fermentation volume (i.e., volume of culture media comprising the recombinant host cells), and a suitable fermentation vessel.

Suitable culture media include all culture media in which the recombinant host cell can grow and/or remain viable, and produce the recombinant milk protein provided herein. Typically, the culture medium is an aqueous medium that comprises a carbon source, an assimilable nitrogen source (i.e., a nitrogen-containing compound capable of releasing nitrogen in a form suitable for metabolic utilization by the recombinant host cell), and a phosphate source.

Non-limiting examples of carbon sources include monosaccharides, disaccharides, polysaccharides, acetate, ethanol, methanol, glycerol, methane, and combinations thereof. Non-limiting examples of monosaccharides include dextrose (glucose), fructose, galactose, xylose, arabinose, and combinations thereof. Non-limiting examples of disaccharides include sucrose, lactose, maltose, trehalose, cellobiose, and combinations thereof. Non-limiting examples of polysaccharides include starch, glycogen, cellulose, amylose, hemicellulose, maltodextrin, and combinations thereof.

The method according to any of the above can comprise the step of culturing a suitable recombinant host cell comprising a recombinant polynucleotide encoding a β-lactoglobulin in a culture medium comprising a carbon source that consists of glucose, wherein the recombinant β-lactoglobulin produced by the recombinant host cell has non-native O-linked glycosylation on one or more of amino acid residues T4. The method according to any of the above can comprise the step of culturing a suitable recombinant host cell comprising a recombinant polynucleotide encoding a β-lactoglobulin in a culture medium comprising a carbon source that consists of glucose, wherein the recombinant β-lactoglobulin produced by the recombinant host cell has non-native O-linked glycosylation on amino acid residue T97. The method according to any of the above can comprise the step of culturing a suitable recombinant host cell comprising a recombinant polynucleotide encoding a β-lactoglobulin in a culture medium comprising a carbon source that consists of lactose and spent grain, wherein the recombinant β-lactoglobulin produced by the recombinant host cell has non-native O-linked glycosylation on amino acid residue T97. The method according to any of the above can comprise the step of culturing a suitable recombinant host cell comprising a recombinant polynucleotide encoding a β-lactoglobulin in a culture medium comprising a carbon source that consists of glucose, wherein the recombinant β-lactoglobulin produced by the recombinant host cell has non-native O-linked glycosylation on one or more of amino acid residues S27, T6, T97, S116, and T125. The method according to any of the above can comprise the step of culturing a suitable recombinant host cell comprising a recombinant polynucleotide encoding a β-lactoglobulin in a culture medium comprising a carbon source that consists of lactose and spent grain, wherein the recombinant β-lactoglobulin produced by the recombinant host cell has non-native O-linked glycosylation on one or more of amino acid residues S27, T6, T97, S116, and T125

Non-limiting examples of assimilable nitrogen sources include anhydrous ammonia, ammonium sulfate, ammonium hydroxide, ammonium nitrate, diammonium phosphate, monoammonium phosphate, ammonium pyrophosphate, ammonium chloride, sodium nitrate, urea, peptone, protein hydrolysates, corn steep liquor, corn steep solids, spent grain, spent grain extract, and yeast extract. Use of ammonia gas is convenient for large scale operations, and can be employed by bubbling through the aqueous ferment (fermentation medium) in suitable amount. At the same time, such ammonia can also be employed to assist in pH control.

The culture medium can further comprise an inorganic salt, a mineral (e.g., magnesium, calcium, potassium, sodium; e.g., in suitable soluble assimilable ionic and combined forms), a metal or transition metal (e.g., copper, manganese, molybdenum, zinc, iron, boron, iodine; e.g., in suitable soluble assimilable form), a vitamin, and any other nutrient or functional ingredient (e.g., a protease [e.g., a plant-based protease] that can prevent degradation of a recombinant milk protein, a protease inhibitor that can reduce the activity of a protease that can degrade the recombinant milk protein, and/or a sacrificial protein that can siphon away protease activity, an anti-foaming agent, an anti-microbial agent, a surfactant, an emulsifying oil).

Suitable culture media are available from commercial suppliers or may be prepared according to published compositions (e.g., in catalogues of the American Type Culture Collection).

A suitable pH can be a pH of between 2 and 8, 7.5, 7, 6.5, 6, 5.5, 5.4, 5.3, 5.2, 5.1, 5, 4.9, 4.8, 4.7, 4.6, 4.5, 4, 3.5, 3, or 2.5; between 2.5 and 8, 7.5, 7, 6.5, 6, 5.5, 5.4, 5.3, 5.2, 5.1, 5, 4.9, 4.8, 4.7, 4.6, 4.5, 4, 3.5, or 3; between 3 and 8, 7.5, 7, 6.5, 6, 5.5, 5.4, 5.3, 5.2, 5.1, 5, 4.9, 4.8, 4.7, 4.6, 4.5, 4, or 3.5; between 3.5 and 8, 7.5, 7, 6.5, 6, 5.5, 5.4, 5.3, 5.2, 5.1, 5, 4.9, 4.8, 4.7, 4.6, 4.5, or 4; between 4 and 8, 7.5, 7, 6.5, 6, 5.5, 5.4, 5.3, 5.2, 5.1, 5, 4.9, 4.8, 4.7, 4.6, or 4.5; between 4.5 and 8, 7.5, 7, 6.5, 6, 5.5, 5.4, 5.3, 5.2, 5.1, 5, 4.9, 4.8, 4.7, or 4.6; between 4.6 and 8, 7.5, 7, 6.5, 6, 5.5, 5.4, 5.3, 5.2, 5.1, 5, 4.9, 4.8, or 4.7; between 4.7 and 8, 7.5, 7, 6.5, 6, 5.5, 5.4, 5.3, 5.2, 5.1, 5, 4.9, or 4.8; between 4.8 and 8, 7.5, 7, 6.5, 6, 5.5, 5.4, 5.3, 5.2, 5.1, 5, or 4.9; between 4.9 and 8, 7.5, 7, 6.5, 6, 5.5, 5.4, 5.3, 5.2, 5.1, or 5; between 5 and 8, 7.5, 7, 6.5, 6, 5.5, 5.4, 5.3, 5.2, or 5.1; between 5.1 and 8, 7.5, 7, 6.5, 6, 5.5, 5.4, 5.3, or 5.2; between 5.2 and 8, 7.5, 7, 6.5, 6, 5.5, 5.4, or 5.3; between 5.3 and 8, 7.5, 7, 6.5, 6, 5.5, or 5.4; between 5.4 and 8, 7.5, 7, 6.5, 6, or 5.5; between 5.5 and 8, 7.5, 7, 6.5, or 6; between 6 and 8, 7.5, 7, or 6.5; between 6.5 and 8, 7.5, or 7; between 7 and 8, or 7.5; or between 7.5 and 8.

A suitable temperature can be a temperature of between 20° C. and 46° C., 44° C., 42° C., 40° C., 38° C., 36° C., 34° C., 32° C., 30° C., 28° C., 26° C., 24° C., or 22° C.; between 22° C. and 46° C., 44° C., 42° C., 40° C., 38° C., 36° C., 34° C., 32° C., 30° C., 28° C., 26° C., or 24° C.; between 24° C. and 46° C., 44° C., 42° C., 40° C., 38° C., 36° C., 34° C., 32° C., 30° C., 28° C., or 26° C.; between 26° C. and 46° C., 44° C., 42° C., 40° C., 38° C., 36° C., 34° C., 32° C., 30° C., or 28° C.; between 28° C. and 46° C., 44° C., 42° C., 40° C., 38° C., 36° C., 34° C., 32° C., or 30° C.; between 30° C. and 46° C., 44° C., 42° C., 40° C., 38° C., 36° C., 34° C., or 32° C.; between 32° C. and 46° C., 44° C., 42° C., 40° C., 38° C., 36° C., or 34° C.; between 36° C. and 46° C., 44° C., 42° C., 40° C., or 38° C.; between 38° C. and 46° C., 44° C., 42° C., or 40° C.; between 40° C. and 46° C., 44° C., or 42° C., between 42° C. and 46° C. or 44° C.; or between 44° C. and 46° C.

The method according to any of the above can comprise the step of culturing a suitable recombinant host cell comprising a recombinant polynucleotide encoding a β-lactoglobulin at a temperature that is at least 30° C. (e.g., at least 30° C., at least 32° C., at least 34° C., or at least 36° C.), wherein the recombinant β-lactoglobulin produced by the recombinant host cell has O-linked glycosylation on amino acid residue T49. The method according to any of the above can comprise the step of culturing a suitable recombinant host cell comprising a recombinant polynucleotide encoding a β-lactoglobulin at a temperature of about 28° C., wherein the recombinant β-lactoglobulin produced by the recombinant host cell has O-linked glycosylation on amino acid residue T6.

A suitable feed rate can be a feed rate of between 0.01 g and 0.2 g glucose equivalent per g dry cell weight (DCW) per hour.

A suitable pressure can be a pressure of between 0 psig and 50 psig, 40 psig, 30 psig, 20 psig, or 10 psig; between 10 psig and 50 psig, 40 psig, 30 psig, or 20 psig; between 20 psig and 50 psig, 40 psig, or 30 psig; between 30 psig and 50 psig, or 40 psig; or between 40 psig and 50 psig.

A suitable oxygenation can be an aeration rate of between 0.1 volumes of oxygen per liquid volume in the fermentor per minute (vvm) and 2.1 vvm, 1.9 vvm, 1.7 vvm, 1.5 vvm, 1.3 vvm, 1.1 vvm, 0.9 vvm, 0.7 vvm, 0.5 vvm, or 0.3 vvm; between 0.3 vvm and 2.1 vvm, 1.9 vvm, 1.7 vvm, 1.5 vvm, 1.3 vvm, 1.1 vvm, 0.9 vvm, 0.7 vvm, or 0.5 vvm; between 0.5 vvm and 2.1 vvm, 1.9 vvm, 1.7 vvm, 1.5 vvm, 1.3 vvm, 1.1 vvm, 0.9 vvm, or 0.7 vvm; between 0.7 vvm and 2.1 vvm, 1.9 vvm, 1.7 vvm, 1.5 vvm, 1.3 vvm, 1.1 vvm, or 0.9 vvm; between 0.9 vvm and 2.1 vvm, 1.9 vvm, 1.7 vvm, 1.5 vvm, 1.3 vvm, or 1.1 vvm; between 1.1 vvm and 2.1 vvm, 1.9 vvm, 1.7 vvm, 1.5 vvm, or 1.3 vvm; between 1.3 vvm and 2.1 vvm, 1.9 vvm, 1.7 vvm, or 1.5 vvm; between 1.5 vvm and 2.1 vvm, 1.9 vvm, or 1.7 vvm; between 1.7 vvm and 2.1 vvm or 1.9 vvm; or between 1.9 vvm and 2.1 vvm.

A suitable fermentation duration can be a fermentation duration of between 10 hours and 500 hours, 400 hours, 300 hours, 200 hours, 100 hours, 50 hours, 40 hours, 30 hours, or 20 hours; between 20 hours and 500 hours, 400 hours, 300 hours, 200 hours, 100 hours, 50 hours, 40 hours, or 30 hours; between 30 hours and 500 hours, 400 hours, 300 hours, 200 hours, 100 hours, 50 hours, or 40 hours; between 40 hours and 500 hours, 400 hours, 300 hours, 200 hours, 100 hours, or 50 hours; between 50 hours and 500 hours, 400 hours, 300 hours, 200 hours, or 100 hours; between 100 hours and 500 hours, 400 hours, 300 hours, or 200 hours; between 200 hours and 500 hours, 400 hours, or 300 hours; between 300 hours and 500 hours, or 400 hours; or between 400 hours and 500 hours.

A suitable fermentation volume can be between 1 L and 10,000,000 L, 5,000,000 L, 1,000,000 L, 500,000 L, 100,000 L, 50,000 L, 10, 000 L, 5,000 L, 1,000 L, 500 L, 100 L, 50 L, or 10 L; between 10 L and 10,000,000 L, 5,000,000 L, 1,000,000 L, 500,000 L, 100,000 L, 50,000 L, 10, 000 L, 5,000 L, 1,000 L, 500 L, 100 L, or 50 L; between 50 L and 10,000,000 L, 5,000,000 L, 1,000,000 L, 500,000 L, 100,000 L, 50,000 L, 10, 000 L, 5,000 L, 1,000 L, 500 L, or 100 L; between 100 L and 10,000,000 L, 5,000,000 L, 1,000,000 L, 500,000 L, 100,000 L, 50,000 L, 10, 000 L, 5,000 L, 1,000 L, or 500 L; between 500 L and 10,000,000 L, 5,000,000 L, 1,000,000 L, 500,000 L, 100,000 L, 50,000 L, 10, 000 L, 5,000 L, or 1,000 L; between 1,000 L and 10,000,000 L, 5,000,000 L, 1,000,000 L, 500,000 L, 100,000 L, 50,000 L, 10, 000 L, or 5,000 L; between 5,000 L and 10,000,000 L, 5,000,000 L, 1,000,000 L, 500,000 L, 100,000 L, 50,000 L, or 10, 000 L; between 10,000 L and 10,000,000 L, 5,000,000 L, 1,000,000 L, 500,000 L, 100,000 L, or 50,000 L; between 50,000 L and 10,000,000 L, 5,000,000 L, 1,000,000 L, 500,000 L, or 100,000 L; between 100,000 L and 10,000,000 L, 5,000,000 L, 1,000,000 L, or 500,000 L; between 500,000 L and 10,000,000 L, 5,000,000

L, or 1,000,000 L; between 1,000,000 L and 10,000,000 L, or 5,000,000 L; or between 5,000,000 L and 10,000,000 L.

A suitable fermentation vessel can be any fermentation vessel known in the art. Non-limiting examples of fermentation vessels include culture plates, shake flasks, fermentors (e.g., stirred tank fermentors, airlift fermentors, bubble column fermentors, fixed bed bioreactors, laboratory fermentors, industrial fermentors, or any combination thereof), used at any suitable scale (e.g., small-scale, large-scale) and in any process (e.g., solid culture, submerged culture, batch, fed-batch, or continuous-flow).

Purifying Native or Recombinant Milk Protein

Methods for purifying native or recombinant proteins (e.g., from milk or fermentation broths) to obtain preparations comprising native or recombinant proteins are well-known in the art (see, for example, Protein Purification, J C Janson and L Ryden, Eds., VCH Publishers, New York, 1989; Protein Purification Methods: A Practical Approach, ELV Harris and S Angel, Eds., IRL Press, Oxford, England, 1989), and can be adapted to purify native or recombinant milk proteins.

A milk protein can be purified on the basis of its molecular weight, for example, by size exclusion/exchange chromatography, ultrafiltration through membranes, gel permeation chromatography (e.g., preparative disc-gel electrophoresis), or density centrifugation.

A milk protein also can be purified on the basis of its surface charge or hydrophobicity/hydrophilicity, for example, by isoelectric precipitation, anion/cation exchange chromatography, isoelectric focusing (IEF), or reverse phase chromatography.

A milk protein also can be purified on the basis of its solubility, for example, by ammonium sulfate precipitation, isoelectric precipitation, surfactants, detergents, or solvent extraction.

A milk protein also can be purified on the basis of its affinity to another molecule, for example, by affinity chromatography, reactive dyes, or hydroxyapatite. Affinity chromatography can include the use of an antibody having a specific binding affinity for the milk protein, or nickel NTA for a His-tagged recombinant milk protein, or a lectin to bind to a sugar moiety on a recombinant milk protein, or any other molecule that specifically binds the milk protein. In some embodiments, the recombinant milk protein carries a tag that facilitates purification. Non-limiting examples of such tags include epitope tags and protein tags. Non-limiting examples of epitope tags include c-myc, hemagglutinin (HA), polyhistidine (6x-HIS), GLU-GLU, and DYKDDDDK (FLAG) epitope tags. Non-limiting examples of protein tags include glutathione-S-transferase (GST), green fluorescent protein (GFP), and maltose binding protein (MBP). An epitope or protein tag may be removed following isolation of the recombinant milk protein (e.g., via protease cleavage).

A recombinant milk protein that is secreted by a recombinant host cell can be purified directly from the culture medium. A recombinant milk protein that is not secreted by a recombinant host cell can be purified from a cell lysate.

A milk protein can be purified to a purity of greater than 30%, greater than 35%, greater than 40%, greater than 45%, greater than 50%, greater than 55%, greater than 60%, greater than 65%, greater than 70%, greater than 75%, greater than 80%, greater than 85%, greater than 90%, greater than 95%, greater than 97%, or greater than 99% relative to other components comprised in the fermentation broth or preparation, or to at least 2-fold, at least 3-fold, at least 4-fold, at least 5-fold, at least 6-fold, at least 7-fold, at least 8-fold, at least 9-fold, or at least 10-fold greater abundancy relative to other components comprised in the fermentation broth, or to a purity of greater than 30%, greater than 35%, greater than 40%, greater than 45%, greater than 50%, greater than 55%, greater than 60%, greater than 65%, greater than 70%, greater than 75%, greater than 80%, greater than 85%, greater than 90%, greater than 95%, greater than 97%, or greater than 99% by weight.

The identity of the milk protein can be confirmed and/or quantified by high performance liquid chromatography (HPLC), Western blot analysis, Eastern blot analysis, polyacrylamide gel electrophoresis, capillary electrophoresis, formation of an enzyme product, disappearance of an enzyme substrate, and 2-dimensional mass spectroscopy (2D-MS/MS) sequence identification.

Native or recombinant milk protein can further be post-processed. Post-processing may alter certain chemical and/or physical properties of the native or recombinant milk protein, including but not limited to size, charge, hydrophobicity, hydrophilicity, solvation, protein folding, and chemical reactivity.

Post-processing can comprise fragmenting (e.g., by chemical means or by exposure to protease enzymes [e.g., trypsin, pepsin]), heating (e.g., to remove protein aggregates), removing reactive sites (e.g., removing reactive sites of methionine and/or tryptophan residues by oxidation), modulating (e.g., via chemical, photochemical, and/or enzymatic strategies), cyclizing, biotinylating (i.e., attaching biotin), and conjugation to other elements (e.g., poly-ethylene-glycol, antibodies, liposomes, phospholipids, DNA, RNA, polynucleotides, sugars, disaccharides, polysaccharides, starches, cellulose, detergents, cell walls).

Post-processing can occur in a random manner or in a site-specific manner (e.g., at sulfhydryl groups of cysteine residues [e.g., for aminoethylation, formation of iodoacetamides, formation of maleimides, formation of Dha, covalent attachment via disulfide bonds, and desulfurization], at primary amine groups of lysine residues [e.g., for attachment of activated esters, sulfonyl chlorides, isothiocyanates, unsaturated aldehyde esters, and aldehydes], at phenolic hydroxyl groups of tyrosine residues, at specific allergenic epitopes [e.g., glycan groups]).

Native or recombinant milk protein can be spray dried or concentrated via evaporation (e.g., to obtain a powder).

One or more native and/or recombinant milk proteins can be combined to obtain a milk protein component, and optionally combined with one or more other ingredients to obtain a dairy substitute according to any of the above. Heating can aid in hydrating powder compositions.

Method for Producing Food Product

In another aspect, provided herein is a method for producing a food product according to any of the above.

A variety of recipes exist for preparing a food product, and any such recipe can be used in the method provided herein to produce a food product according to any of the above. The dairy substitute according to any of the above can be used in such recipes in place of milk or in addition to milk.

EXAMPLES

The following examples are included to illustrate specific embodiments of the invention. The techniques disclosed in the examples represent techniques discovered by the inventors to function well in the practice of the invention; however, those of skill in the art should, in light of the present disclosure, appreciate that many changes can be made in the specific embodiments that are disclosed and still obtain a like or similar result without departing from the spirit and scope of the invention. Therefore, all matter set forth or shown in the examples is to be interpreted as illustrative and not in a limiting sense.

Example 1: Production of Recombinant β-Lactoglobulin with Non-Native PTM in Recombinant *Pichia pastoris* Host Cell A recombinant *Pichia pastoris* host cell was generated by transforming *Pichia pastoris* (Komagateaella phaffii) strain BGF12 (Biogrammatics, Carlsbad, CA) with a vector comprising a *Bos taurus* β-lactoglobulin coding sequence (AMINO ACIDS 17-178 OF UNIPROT SEQUENCE P02754) that was codon-optimized for expression in yeast and fused in frame to an N-terminal secretion signal (pre or pre-pro signal peptide region of the alpha mating factor of *Saccharomyces cerevisiae*). The secreted β-lactoglobulin coding sequence was flanked by a promoter (pGAP or pAOX1) and a terminator (tAOX1 pA signal). The vector further comprised dominant resistance markers for selection of bacterial and yeast transformants, and a bacterial origin of replication. The vector was transformed into the *Pichia pastoris* host cells using a heat-shock protocol to generate recombinant host strains comprising an integrated copy of the secreted β-lactoglobulin coding sequence. Transformants were plated on minimal media and incubated for 48 hours at 30° C. Clones from each final transformation were inoculated into 300 μL of Buffered Minimal Media in 96-well blocks, and incubated for 72 or more than 100 hours at 30° C. with agitation at 600 rpm. A sample was removed, the recombinant host cells were pelleted via centrifugation, and the fermentation supernatant was recovered. ELISA assays and SDS-PAGE gel analyses were performed with the supernatant samples to identify positive transformants.

The recombinant *Pichia pastoris* host cell was grown in a minimal basal media containing phosphate and nitrogen salts with 80% of glycerol as a starting feedstock, in a stirred fermentation vessel controlled at 30° C., 1 VVM of air flow, and minimum agitation of 100 rpm. The pH of the fermentation broth was controlled at 5 with on-demand addition of ammonium hydroxide. Once batch glycerol was depleted, glycerol was added via a programmed feed recipe that delivered glycerol at a rate of 6 g/L/h. The oxygen demand of the strain was satisfied by controlling agitation rate as demanded. When agitation was no longer able to maintain the dissolved oxygen set-point, 100% oxygen gas was sparged into the vessel to control dissolved oxygen. The pH of fermentation was shifted from 5 to 3 once batched glycerol has been depleted. Antifoam C was added as needed to control foam. The fermentation was harvested after at least 100 hours, at about cell density of 600-800 at OD600. Biomass was removed from the broth by centrifugation at 5,000 g. The supernatant was concentrated over 100 kDa MWCO membranes. The concentrate retentate was diafiltered over 5 kda MWCO membranes into 50 mM imidazole, pH 6.8. The concentrated retentate was passed over a Q sepharose FF column. The mobile phase was 50 mM imidazole, pH 6.8, and the recombinant β-lactoglobulin was eluted on a 2M NaCl gradient. The gradient was run from 0-30% over 30 column volumes. Peak fractions were collected and analyzed on RP-HPLC. Peaks containing recombinant β-lactoglobulin with a purity of >85% were pooled for final diafiltration into water.

Samples of native *Bos taurus* β-lactoglobulin and of the recombinant β-lactoglobulin produced by the recombinant *Pichia pastoris* host cell were trypsin digested. The tryptic peptides were analyzed for the presence of phosphates and single N- and O-linked hexoses (fructose, galactose, glucose, mannose; only single hexoses were interrogated because no major mass shift was observed for the recombinant milk proteins compared to *Bos taurus* standards on SDS-PAGE gels) by mass spectrometry (LC-MS). The tryptic fragments covered 100% of the β-lactoglobulin sequences, and revealed that native *Bos taurus* β-lactoglobulin was not phosphorylated and not N-glycosylated, but O-glycosylated on amino acid residues Y99 and/or N63; whereas the recombinant β-lactoglobulin was not N-glycosylated, but phosphorylated on amino acid residues Y20, Y99, Y102, T18, T97, S110, and/or S150, and O-glycosylated on amino acid residues Y42, Y99, Y102, and/or S110.

Native *Bos taurus* β-lactoglobulin and the recombinant β-lactoglobulin were subjected to differential scanning calorimetry (Mircocal PEAQ-DSC). Test samples were solubilized in 10 mM citrate buffer at pH 2.5 to 1.0 and 0.5 mg/mL protein. The samples were exposed to a temperature range of 20° C. to 100° C., the scan rate was 60° C./h. Each sample was scanned twice to determine percent of protein that refolded after the first heat treatment. Measurements were analyzed with PEAQ-DSC software.

As shown in Table 1, the recombinant β-lactoglobulin and native *Bos taurus* β-lactoglobulin had similar thermograms, melting temperatures, and van't Hoff enthalpies.

TABLE 1

DSC Data of *Bos Taurus* and recombinant β-lactoglobulin from *Pichia pastoris*

| Sample | Concentration (mg/mL) | Tm (° C.) | ΔHcal (kcal/mol) | ΔHvH (kcal/mol) | $\Delta H_{cal}/\Delta H_{vH}$ |
|---|---|---|---|---|---|
| *Bos Taurus* β-lactoglobulin | 0.50 | 84.60 | 67.90 | 102.00 | 0.67 |
| *Bos Taurus* β-lactoglobulin | 1.00 | 85.00 | 67.90 | 104.00 | 0.65 |
| Recombinant β-lactoglobulin | 0.50 | 83.30 | 76.90 | 105.00 | 0.73 |
| Recombinant β-lactoglobulin | 1.00 | 83.50 | 78.90 | 108.00 | 0.73 |

Tm = melting temperature;
$\Delta H_{cal}$ = transition enthalpy;
$\Delta H_{vH}$ = van't Hoff enthalpy.

The transition enthalpy ($\Delta H_{cal}$) of recombinant β-lactoglobulin was greater than that of *Bos taurus* β-lactoglobulin (77.9 kcal/mol vs 67.9 kcal/mol, respectively), indicating more heat is required to denature recombinant β-lactoglobulin. The transition enthalpy is greater than van't Hoff in both recombinant and *Bos taurus* β-lactoglobulin, indicating a cooperative unfolding mechanism, for example a dimer dissociating into a monomer before denaturation. Second scans indicate 37% of recombinant β-lactoglobulin refolds after the first heat treatment whereas 44% of *Bos taurus*

β-lactoglobulin refolds after the first heat treatment (both measurements taken at 1 mg/mL protein).

Example 2: Production of Recombinant β-Lactoglobulin with Non-Native PTM in Recombinant *Trichoderma reesei* Host Cell A recombinant *Trichoderma reesei* host cell was generated by transforming *Trichoderma reesei* (Hypocrea jecorina) strain Qm6a with a vector comprising a *Bos taurus* β-lactoglobulin coding sequence (AMINO ACIDS 17-178 OF UNIPROT SEQUENCE P02754). ELISA assays and SDS-PAGE gel analyses were performed with the supernatant samples to identify positive transformants.

The recombinant *Trichoderma reesei* host cell was grown in a minimal basal media containing inorganic salts as sources of phosphate, ammonium, magnesium, potassium, sodium, sulfate, chloride, calcium, iron, manganese, zinc, molybdenum, copper, cobalt, and borate, with a carbohydrate-based carbon source as a starting feedstock, in a stirred fermentation vessel controlled at temperatures ranging between 25° C. through 34° C., at aeration rates between 0.2 vvm and 1 vvm, and a minimum agitation to ensure proper mixing and dispersion of biomass and nutrients including oxygen (as delivered in compressed air). The pH of the fermentation broth was controlled at various setpoints ranging from 3.0 to 5.5 with on-demand addition of ammonium hydroxide. Once the batch carbohydrate was depleted, a solution containing glucose or lactose was added via a programmed feed recipe that delivered the carbon source at specific feed rates ranging from 0.01 through 0.1 g dry substrate per gram DCM per hour. The oxygen demand of the culture was satisfied by controlling agitation rate as demanded to maintain a target dissolved oxygen set point ranging from 5% to 50%. When agitation was no longer able to maintain the target dissolved oxygen set-point, aeration was increased up to 2.0 vvm. Once the culture was running at maximum agitation and aeration, the dissolved oxygen was allowed to drop below setpoint with no further actions taken. Various antifoams, including but not limited to ACP 1500, Antifoam 204 (Sigma), Erol DF6000K, Hodag K-60K, Industrol DF204 (BASF), P-2000E (Dow), SAG 471, SAG 5693, SAG 710, SAG 730, Silicone Antifoam (Sigma), Struktol J647, Struktol J673A, and sunflower oil were added as needed to control foaming in the fermentations. Each fermentation was harvested after at least 120 h, at biomass concentrations of typically between 20 g and 50 g DCW per L. Biomass was removed from the broth by centrifugation at 5,000×g, and the recombinant β-lactoglobulin was purified.

Samples of native *Bos taurus* β-lactoglobulin and of the recombinant β-lactoglobulin produced by the recombinant *Trichoderma reesei* host cell were trypsin digested. N-linked hexoses were investigated with samples treated with EndoH (New England Biolabs) prior to digest N-linked glycans to a single hexose. The tryptic peptides were analyzed for the presence of phosphates and single N- and O-linked hexoses (fructose, galactose, glucose, mannose; only single hexoses were interrogated for N-linked treatment as these were treated with or without EndoH; 1-3 hexoses were interrogated for O-linked treatment as previously attributed in literature as typical O-glycan length in *Trichoderma reesei*; no major mass shift was observed for the recombinant milk proteins compared to *Bos taurus* standards on SDS-PAGE gels) by mass spectrometry (LC-MS). The tryptic fragments covered 100% of the β-lactoglobulin sequences, and revealed that native *Bos taurus* β-lactoglobulin was not phosphorylated and was not N-glycosylated, but O-glycosylated on amino acid residues Y99 and/or N63; whereas the recombinant β-lactoglobulin was not N-glycosylated, but phosphorylated on amino acid residues T4, T6, T18, Y20, S21, S27, S30, S36, Y42, T49, T97, Y99, Y102, S110, T125, and/or S150 (wherein phosphorylation on amino acid residues T18, Y20, S21, S27, T49, T97, Y99, Y102, S110, and/or S150 was observed in greater than 30% of 24 runs; and phosphorylation on amino acid residues Y20, S21, T97, Y99, Y102, S110, and/or S150 was observed in greater than 50% of 24 runs), and O-glycosylated on amino acid residues T4, T6, T18, S21, S27, S30, S36, T49, T97, S110, S116, T125, S150, and/or T154 (wherein glycosylation on amino acid residues T18, S21, T49, T97, S110, and/or S150 was observed in greater than 30% of 24 runs; and glycosylation on amino acid residues T18, S21, and/or S110 was observed in greater than 50% of 24 runs).

The following correlations were observed between O-linked glycosylation of the recombinant LGB and fermentation conditions: i) Glucose only as carbon source (vs. alternatives containing more complex substrate sources) correlated with O-linked glycosylation on amino acid residue T4; ii) higher temperature (vs. lower temperature in the range of conditions tested) correlated with O-linked glycosylation on amino acid residue T49; iii) either glucose only or lactose and spent grain combined as carbon source correlated with O-linked glycosylation on amino acid residues S27, T6, S116, and T125; iv) glucose or lactose and spent grain combined as carbon source correlated with O-linked glycosylation on amino acid residue T97; and v) fermentation temperature 28° C. (vs. at higher temperatures) correlated with O-linked glycosylation on amino acid residue T6.

Native *Bos taurus* β-lactoglobulin and recombinant β-lactoglobulin were subjected to various conformational analyses, including: i) Ellman's reagent testing: measures the number of solvent-exposed sulfhydryls, which on proteins stem from solvent-exposed cysteine residues; *Bos taurus* LGB has 1 free cysteine residue, which is only solvent-exposed when the protein is denatured; ii) Differential scanning calorimetry: reveals thermodynamics of the protein; melting temperature (TM) expresses the temperature at which half of the LGB if unfolded; melting temperature TM,1/2 is a measure of the homo- or heterogeneity of the sample (the smaller the value, the more homogeneous the sample); delta H (area under the curve compared to that of a standard) reports the fraction of folded protein in a sample; and refolding ability expresses the fraction of protein in a sample that refolds after a 1st round of heating; and iii) Non-reducing PAGE analysis: separates proteins based on monomer molecular weight, and therefore expresses the extent of intermolecular disulfide shuffling (i.e., how much protein is in covalently linked dimers, trimers, etc. conformation).

As shown in Table 2, recombinant β-lactoglobulin and *Bos taurus* β-lactoglobulin have different conformations.

TABLE 2

Conformational Data of *Bos Taurus* and recombinant
β-lactoglobulin from *Trichodermia reseii*

| | Ellman's reagent | | Differential scanning calorimetry (DSC) (a) | | | | Non-reducing PAGE |
|---|---|---|---|---|---|---|---|
| Sample | Protein in native state | Protein in denatured state | Tm (° C.) | Tm, ½ (° C.) | ΔH (kcal/mol) | Refolding ability | % LGB non-monomer |
| *Bos taurus* β-lactoglobulin | — | — | 86.0 | 10.7 | 78.2 | 100% | — |
| recombinant β-lactoglobulin #1 | 0.55 | 0.00 | 80.5 | 11.2 | 66.0 | 84% | 8.0% |
| recombinant β-lactoglobulin #2 | 0.14 | 0.62 | 85.4 | 11.5 | 70.0 | 90% | 15.4% |
| recombinant β-lactoglobulin #3 | — | — | 85.9 | 14.1 | 66.4 | 85% | 17.6% |
| recombinant β-lactoglobulin #4 | — | — | 86.4 | 9.6 | 57.9 | 74% | 26.2% |
| recombinant β-lactoglobulin #5 | 0.12 | 1.07 | 85.2 | 10.9 | 83.3 | 107% | 0.0% |
| recombinant β-lactoglobulin #6 | 0.40 | 1.09 | 85.2 | 11.0 | 83.3 | 107% | 0.0% |
| recombinant β-lactoglobulin #7 | — | — | 84.5 | 11.6 | 64.5 | 83% | 0.0% |
| recombinant β-lactoglobulin #8 | 0.25 | 1.02 | — | — | — | — | 20.0% |
| recombinant β-lactoglobulin #9 | 0.06 | 0.92 | — | — | — | — | 0.0% |
| recombinant β-lactoglobulin #10 | 0.18 | 0.82 | — | — | — | — | 0.0% |
| recombinant β-lactoglobulin #11 | 0.09 | 0.91 | — | — | — | — | 0.0% |

(a) Test samples were solubilized in 10 mM citrate buffer at pH 2.5 to 0.5-5 mg/mL protein. The samples were exposed to a temperature range of 25° C. to 110° C., and scanned using a Microcal PEAQ-DSC (Malvern Panalytical Inc., Westborough, MA) at a scan rate of 250° C./h. Each sample was scanned twice to determine percent of protein that refolded after the first heat treatment. Measurements were analyzed with PEAQ-DSC software.

Example 3: Measurement of Mechanical Attributes

Mechanical attributes can be measured with a TA.XT plus C Texture Analyzer (Stable Micro Systems Ltd, Surrey, England) with a conical probe (right circular cone with 22 mm height, 27 mm base diameter, 60° apex angle (i.e., angle of the cone tip), acrylic) performing a double compression test, to a depth of 11.5 mm.

During the double compression test, the texture analyzer probe twice descends and ascends onto/into a sample through the 11.5 mm test depth at a slow constant rate (0.83 mm/sec, with a momentary pause (5.0 sec) between the completion of 1st ascent and the beginning of 2nd descent; i.e., START--DOWNSTROKE--UPSTROKE--MOMENTARY-PAUSE--DOWNSTROKE--UPSTROKE--END), and the instrument's load cell detects the instantaneous force exerted on the probe as it moves at that constant rate (with a trigger force of 0.049 N). The resulting data from a single double compression test is best visualized as a two-peaked curve on a plot with time as the x-axis and force as the y-axis. The shape of the curve was generally: START (0 force)--DOWNSTROKE into sample (from 0, force increases as probe descends further, up to a peak force experienced at 11.5 mm depth (maximum compression))--UPSTROKE from compressed sample (from peak force, force now decreases as probe ascends further, reaching 0 force and continuing into the negative, then rising back up to 0 force when probe has separated from and lifted above the sample (negative force region due to adhesion of sample to probe))--MOMENTARY-PAUSE (sample recovers, springing back (0 force))--DOWNSTROKE into sample (from 0, force increases as probe descends further, up to a peak force)--UPSTROKE from compressed sample (from peak force, force decreases as probe ascends further, reaching 0 force and continuing into the negative, then rising back up to 0 force when probe has separated from and lifted above the sample)--END (0 force).

The peak force recorded from the first compression can be larger than the peak force recorded from the second compression because the sample's structure can be damaged during the first compression. The area under the curve for the second compression (i.e., work during second compression) can also be less than the area under the curve for the first compression (i.e., work during first compression) due to such structural damage. Because the damaged sample does not rebound fully to its original height after the first compression, the 2nd downstroke registers a force of 0 as it descends past 25 mm until it makes contact with the sample surface at a new lower height, at a later time. Area under the curve for a given compression can be subdivided into a downstroke portion (i.e., downstroke energy of the compression) and an upstroke portion (i.e., upstroke energy of the compression). During the downstroke, a portion of the downstroke energy is stored in the sample as elastic potential energy, and during the upstroke, a portion of that elastic potential energy is exerted by the sample upon the ascending probe as the upstroke energy. The upstroke energy of a compression is thus always less than the preceding downstroke energy of compression (though an ideal, perfectly elastic sample would have an equivalent downstroke energy and upstroke energy). During the upstroke, when the probe ascends beyond the compressed-and-rebounding sample, the force registered goes into the negative as the probe pulls away from the sample surface (which has adhered to the probe).

A number of output parameters can be calculated from a single double compression test curve, with different parameters giving insights into different properties of a sample. Exponent Connect software (version 7.0.3.0, Stable Micro Systems Ltd, Surrey, England) can be used to calculate output parameters for each double compression test individually. Peak Force (i.e., hardness/firmness) is the maximum force during the first compression, conveying information on the hardness/firmness of a sample; a higher Peak Force means the sample resisted the downstroke with more force, and is likely a firmer sample. The First Upstroke Negative Work (i.e., adhesiveness) conveys information on a sample's adhesiveness, as the upstroke's negative force portion of the curve reflects the sample's adherence to the probe; a more-negative value implies a more-adhesive sample. Recoverable Energy (i.e., resilience) is calculated by dividing the first upstroke energy by the first downstroke energy, and conveys information on a sample's ability to store and expend downstroke energy in an elastic fashion; a value of 100% represents an ideal, perfectly elastic sample. Ratio of Work--Second to First Compression (i.e., structure integrity/cohesiveness) is calculated by dividing the work during the second compression by the work during the first compression, and conveys information on the structural integrity/cohesiveness of the sample after having its structure damaged by the first compression; a higher value (i.e., closer to 1.0) implies a greater structural integrity after the first compression, whereas a lower value (i.e., closer to 0.0) implies a greater deal of structural damage from the first compression. Rebound (i.e., elasticity/springiness) is calculated by dividing the second downstroke sample contact time (i.e., the length of time in which the probe registered a non-zero force during the second downstroke) by the first downstroke sample contact time; a value of 100% indicates that the sample rebounded fully to the initial height of contact from the first compression. The derived parameter of (Peak Force)×(Ratio of Work--Second to First Compression)×(Rebound) (i.e., chewiness/breakdown) conveys information on the general breakdown of a sample after the first compression, and a higher value may indicate what a human would consider a "chewier" sample and a lower value a "more tender" sample.

The foregoing discussion of the invention has been presented for purposes of illustration and description. The foregoing in not intended to limit the invention to the form or forms disclosed herein. Although the description of the invention has included description of one embodiment and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those disclosed herein, and without intending to publicly dedicate any patentable subject matter.

The invention claimed is:

1. A dairy substitute composition comprising:
 a milk protein component that confers on the dairy substitute composition a sensory attribute of milk selected from the group consisting of a taste, a flavor, an aroma, and an eating quality, wherein the milk protein component consists of:
 a recombinant β-lactoglobulin;
 an optional recombinant k-casein; and
 one or more other milk proteins selected from the group consisting of: a native and/or recombinant lactoperoxidase, and a native and/or recombinant GMP.

2. The dairy substitute of claim 1, wherein the dairy substitute is essentially free of a protein obtained from plant.

3. The dairy substitute of claim 1, wherein the dairy substitute is essentially free of any protein other than the recombinant β-lactoglobulin, the optional recombinant k-casein, and the one or more other milk proteins comprised in the milk protein component.

4. The dairy substitute of claim 1, wherein the recombinant β-lactoglobulin comprises an amino acid sequence that comprises one or more of amino acid residues selected from T4, T6, T18, 821, S27, S30, S36, T49, 197, S110, S116, T125, S150, N152, and T154 of *Bos taurus* β-lactoglobulin, and has non-native glycosylation on one or more of such amino acid residues.

5. The dairy substitute of claim 1, wherein the recombinant β-lactoglobulin comprises an amino acid sequence that comprises one or more of amino acid residues selected from T4, T6, T18, Y20, S21, S27, 330, S36, Y42, T49, 176, 197, Y99, Y102, S110, S116, T125, S150, and T154 of *Bos taurus* β-lactoglobulin, and has non-native phosphorylation on one or more of such amino acid residues.

6. The dairy substitute of claim 1, wherein the dairy substitute comprises a milk protein polymer network.

7. The dairy substitute of claim 1, wherein the milk protein component comprises the optional recombinant k-casein, and wherein the optional recombinant k-casein comprises micellar casein concentrate.

8. The dairy substitute of claim 1, wherein the recombinant β-lactoglobulin is at least 95% identical to a β-lactoglobulin found in a mammal-produced milk.

9. The dairy substitute of claim 1, wherein the recombinant β-lactoglobulin is at least 99% identical to a β-lactoglobulin found in a mammal-produced milk.

10. The dairy substitute of claim 7, wherein the one or more other milk proteins consists of the native and/or recombinant GMP.

11. The dairy substitute of claim 8, wherein the mammal-produced milk is sheep milk, cow milk, or goat milk.

12. The dairy substitute of claim 9, wherein the mammal-produced milk is sheep milk, cow milk, or goat milk.

13. The dairy substitute of claim 1, wherein the recombinant β-lactoglobulin is produced in a recombinant host cell selected from the group consisting of: a recombinant fungal host cell, a recombinant bacterial host cell, a recombinant algal host cell, and a recombinant plant host cell.

14. The dairy substitute of claim 13, wherein the recombinant fungal host cell is selected from the group consisting of: *Aspergillus, Candida, Fusarium, Hansenula, Kluyveromyces, Pichia, Saccharomyces, Tetrahymena, Trichoderma, Yarrowia,* and *Zygosaccharomyces*.

15. The dairy substitute of claim 1 further comprising one or more of vitamin A, vitamin B, vitamin E, vitamin D, vitamin K, calcium, potassium, potassium, sodium, and citrate.

16. The dairy substitute of claim 1 further comprising one or more sweetening agents selected from the group consisting of brazzeine, curculin, mabinlin, miraculin, monelin, pentadin, and thaumatin.

17. The dairy substitute of claim 1 further comprising a plant oil.

18. The dairy substitute of claim 1 further comprising an interesterified oil.

19. The dairy substitute of claim 1 further comprising a triglyceride comprising butyric acid, caproic acid, caprylic acid, and capric acid.

20. The dairy substitute of claim 1, wherein the dairy substitute is a powder.

21. The dairy substitute of claim 1, wherein the dairy substitute is configured to be used as a substitute for a dairy product, the substitute for the dairy product being selected from the group consisting of: substitute milk, substitute yogurt, substitute cheese, substitute cream, substitute frozen confection, and substitute fermented dairy product.

22. A composition comprising the dairy substitute of claim 1.

23. The composition of claim 22, wherein the composition comprises a milk protein polymer network.

24. The composition of claim 22, wherein the composition is a polymer, pharmaceutical product, or personal care product.

25. A method for producing the dairy substitute of claim 1, wherein the method comprises obtaining a recombinant β-lactoglobulin, an optional recombinant k-casein, and one or more other milk proteins selected from the group consisting of a native and/or recombinant serum albumin, a native and/or recombinant lactoperoxidase, and a native and/or recombinant GMP.

* * * * *